(12) United States Patent
Ferrydiansyah et al.

(10) Patent No.: US 10,614,030 B2
(45) Date of Patent: Apr. 7, 2020

(54) TASK CREATION AND COMPLETION WITH BI-DIRECTIONAL USER INTERACTIONS

(71) Applicant: Microsoft Technology Licensing, LLC, Redmond, WA (US)

(72) Inventors: Reza Ferrydiansyah, Redmond, WA (US); Gurpreet Virdi, Redmond, WA (US); Richa Prasad, Seattle, WA (US); Steve Seixeiro, Snohomish, WA (US); Robert Howard, III, Bellevue, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 217 days.

(21) Appl. No.: 15/612,727

(22) Filed: Jun. 2, 2017

(65) Prior Publication Data

US 2018/0349389 A1 Dec. 6, 2018

(51) Int. Cl.
*G06F 16/11* (2019.01)
*G06F 16/25* (2019.01)
(Continued)

(52) U.S. Cl.
CPC .......... *G06F 16/113* (2019.01); *G06F 3/0482* (2013.01); *G06F 16/252* (2019.01); *G06F 16/951* (2019.01); *G06Q 10/10* (2013.01)

(58) Field of Classification Search
CPC ..... G06F 16/951; G06F 16/252; G06F 16/113
See application file for complete search history.

(56) References Cited

U.S. PATENT DOCUMENTS 7,669,136 B1 2/2010 Gaware et al.
8,639,214 B1 * 1/2014 Fujisaki ................. G06Q 20/32
379/88.03

(Continued)

FOREIGN PATENT DOCUMENTS

WO 2016182682 A1 11/2016

OTHER PUBLICATIONS

"Cortana and Your Privacy FAQ", Retrieved from <<https://www.windowsphone.com/en-in/how-to/wp8/cortana/cortana-and-my-privacy-faq>>, Aug. 22, 2014, (2 Pages total).
(Continued)

*Primary Examiner* — Loc Tran
(74) *Attorney, Agent, or Firm* — Mark K. Young; Mayer & Williams PC

(57) ABSTRACT

A digital assistant supported on a local device and/or a remote digital assistant service is disclosed herein. The device may interact with a user and perform various functions or tasks based on the user's input (e.g., web search, set calendar appointments, capture images or video). The digital assistant may identify and store artifacts associated with each action or function. Artifacts may include, for example, people in an image, search results from a web search, participants in a meeting, etc. Subsequently, the user may query the digital assistant for information about one of the artifacts, such as who the participants were in a meeting conducted the prior Thursday. The digital assistant can sift through the various artifacts and provide the user with the relevant information. Additionally, the digital assistant can suggest actions for the user based on the retrieved artifacts, such as to message one of the identified participants.

9 Claims, 29 Drawing Sheets

(51) Int. Cl.
*G06F 16/951* (2019.01)
*G06Q 10/10* (2012.01)
*G06F 3/0482* (2013.01)

(56) References Cited

U.S. PATENT DOCUMENTS

| | | | |
|---|---|---|---|
| 8,843,616 | B2 | 9/2014 | Ochoa et al. |
| 8,972,397 | B2 | 3/2015 | Imig et al. |
| 9,069,862 | B1* | 6/2015 | Perkowitz .............. G06F 16/248 |
| 9,318,108 | B2 | 4/2016 | Gruber et al. |
| 9,501,745 | B2 | 11/2016 | Nitz et al. |
| 9,547,647 | B2 | 1/2017 | Badaskar |
| 2001/0003180 | A1* | 6/2001 | Sakai ................... G06Q 20/102 |
| | | | 705/40 |
| 2008/0289029 | A1 | 11/2008 | Kim et al. |
| 2009/0063690 | A1 | 3/2009 | Verthein et al. |
| 2012/0265528 | A1 | 10/2012 | Gruber et al. |
| 2012/0271676 | A1 | 10/2012 | Aravamudan et al. |
| 2013/0041790 | A1 | 2/2013 | Murugesan et al. |
| 2013/0254685 | A1 | 9/2013 | Batraski et al. |
| 2013/0329060 | A1* | 12/2013 | Yim ..................... H04N 5/2621 |
| | | | 348/207.1 |
| 2014/0143196 | A1 | 5/2014 | White et al. |
| 2014/0187213 | A1* | 7/2014 | Shuster ................. H04W 4/023 |
| | | | 455/414.1 |
| 2015/0161997 | A1 | 6/2015 | Wetsel et al. |
| 2015/0310861 | A1 | 10/2015 | Waltermann et al. |
| 2016/0260433 | A1 | 9/2016 | Sumner et al. |

OTHER PUBLICATIONS

Bedi, et al., "SAPRS: Situation-Aware Proactive Recommender System with Explanations", In Proceedings of the International Conference on Advances in Computing, Communications and Informatics, Sep. 24, 2014, 7 Pages.

Briggs, Justin, "How Do Users Interact with Predictive (Queryless) Search?", Retrieved from <<https://www.briggsby.com/how-do-users-interact-with-predictive-queryless-search/>>, Feb. 1, 2016, (9 Pages total).

Godoy, et al., "Learning Browsing Patterns for Context-Aware Recommendation", In Proceedings of the IFIP 19th World Computer Congress, Aug. 21, 2006, (10 Pages total).

Shokouhi, et al., "From Queries to Cards: Re-ranking Proactive Card Recommendations Based on Reactive Search History", In Proceedings of 38th International ACM SIGIR Conference on Research and Development in Information Retrieval, Aug. 9, 2015, (10 Pages. total).

Tarantola, Andrew, "6 Tips for Getting Started With Google Now", Retrieved from <<http://gizmodo.com/6-tips-for-getting-started-with-google-now-1634881479>>, Sep. 20, 2014, (8 Pages total).

Purewal, Sarah Jacobsson, "The complete list of Cortana commands", https://www.cnet.com/how-to/the-complete-list-of-cortana-commands/, Published on: May 6, 2016, (7 pages total).

DL Cade, "Adobe is Building a Siri-like Assistant for Editing Photos with Your Voice", https://petapixel.com/2017/01/11/adobe-building-siri-like-assistant-editing-photos-voice/, Published on: Jan. 11, 2017, (11 pages total).

U.S. Appl. No. 15/170,490, Gill, et al., "Personal assistant to help recollect & continue the tasks on any device", Filed Date: Jun. 1, 2016.

"International Search Report and Written Opinion Issued in PCT Application No. PCT/US2018/033567", dated Sep. 28, 2018, 11 Pages.

* cited by examiner

200

500

600

900

1000

1100

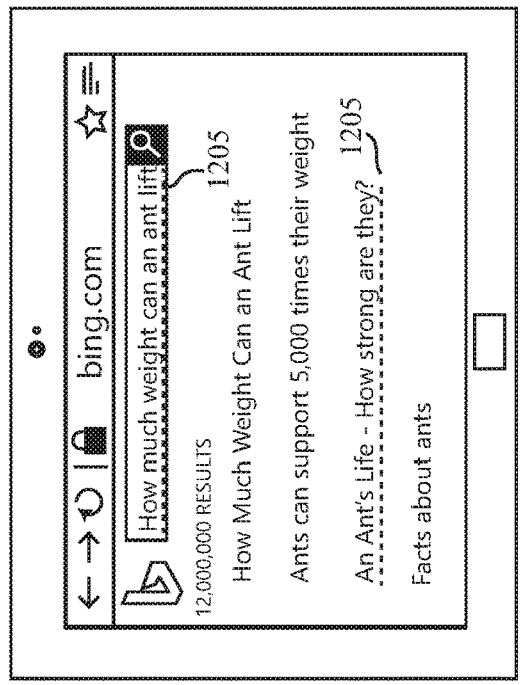

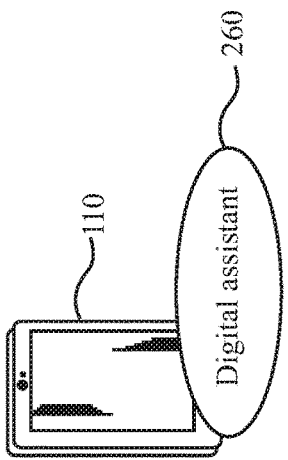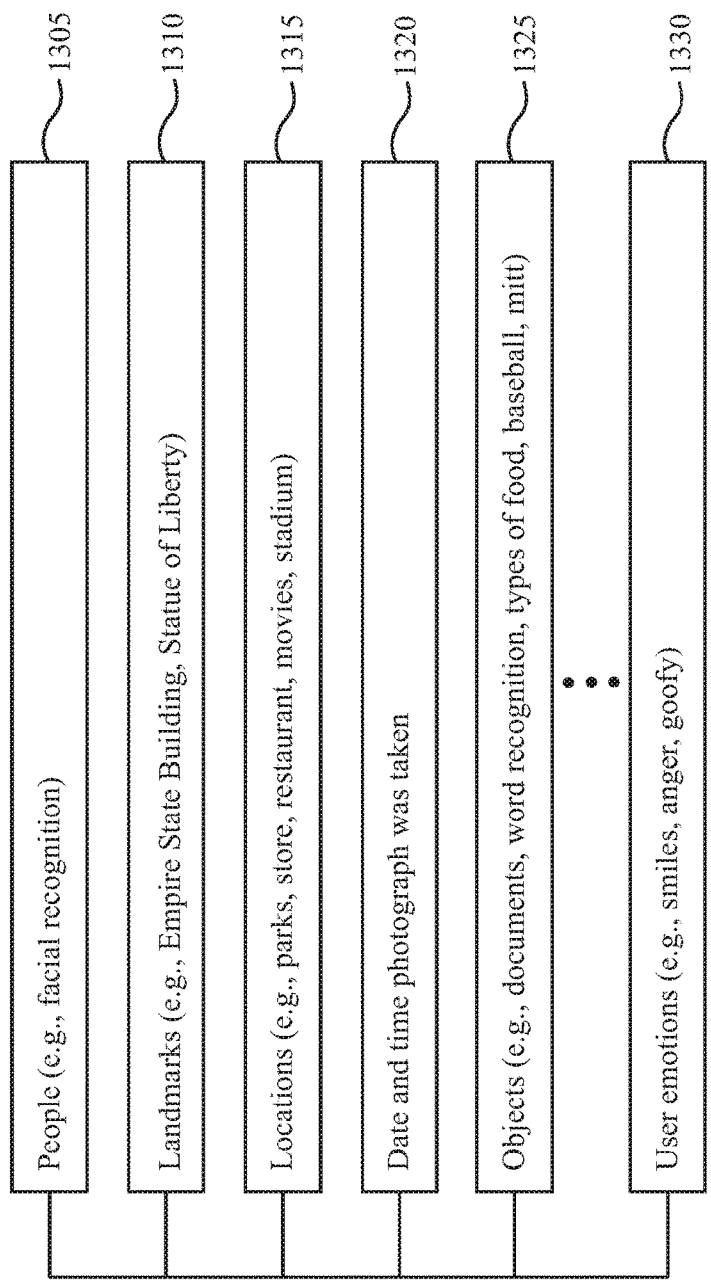
FIG 13

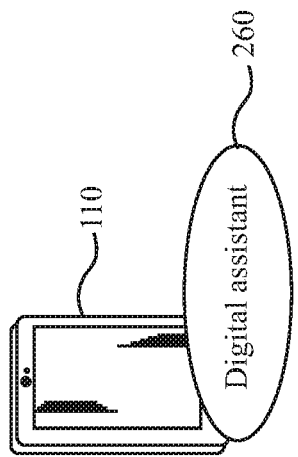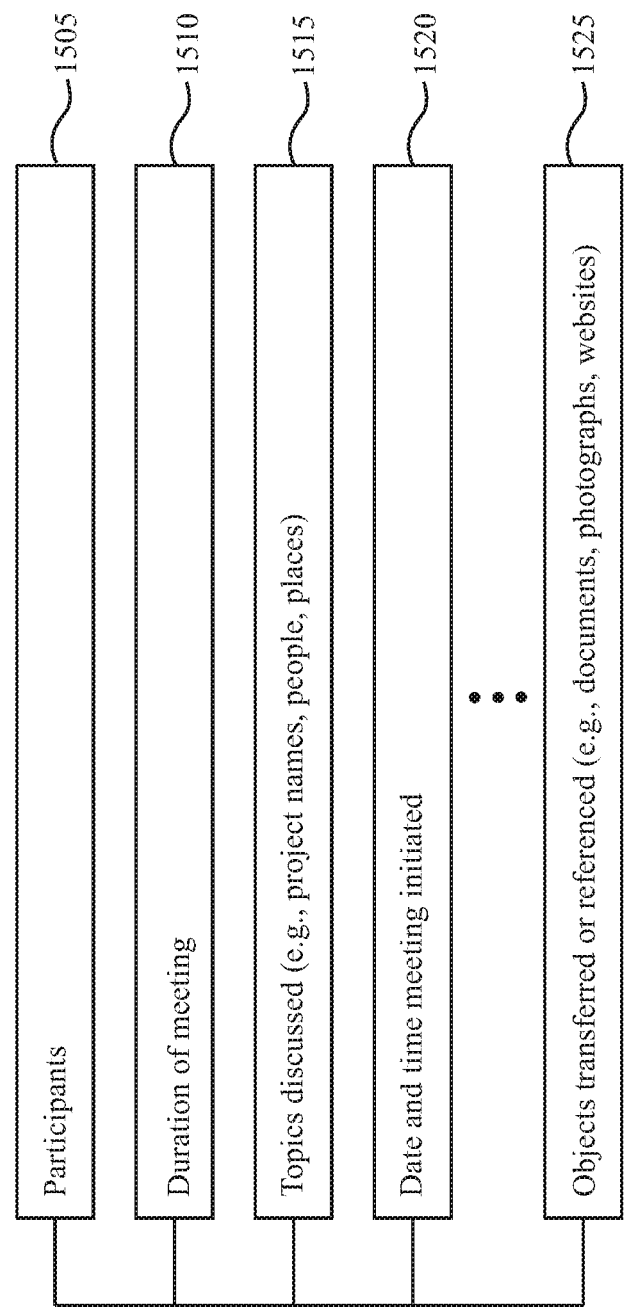
FIG 15

1600

1700

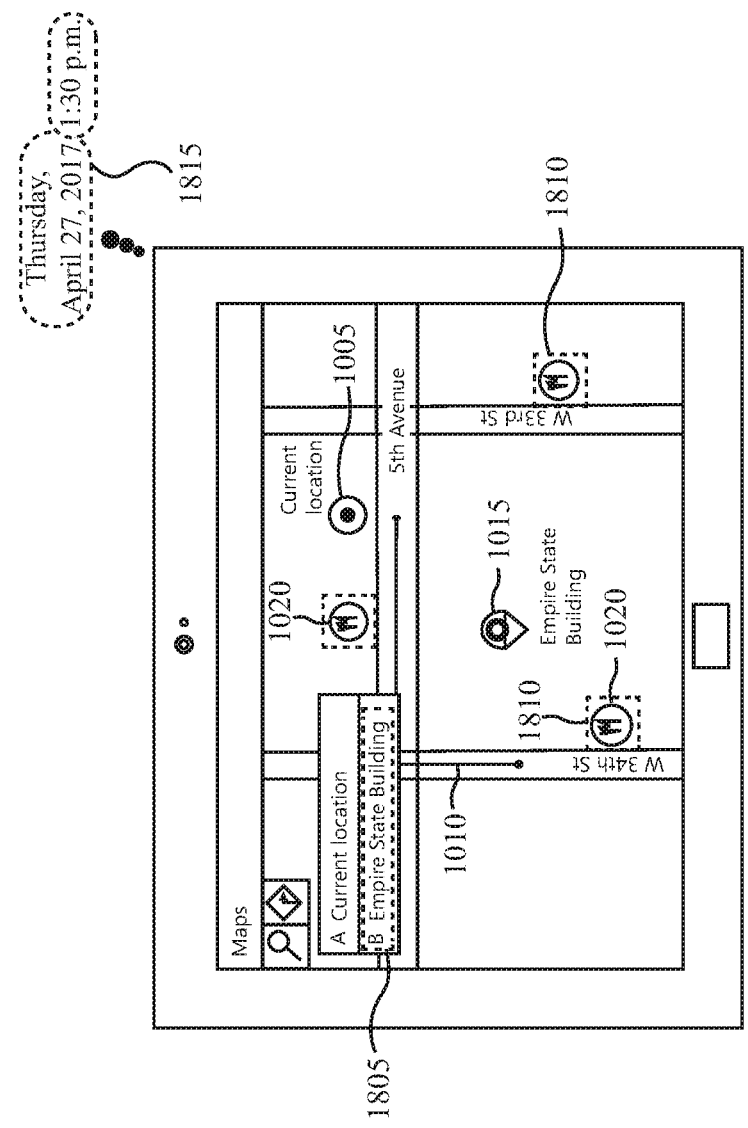

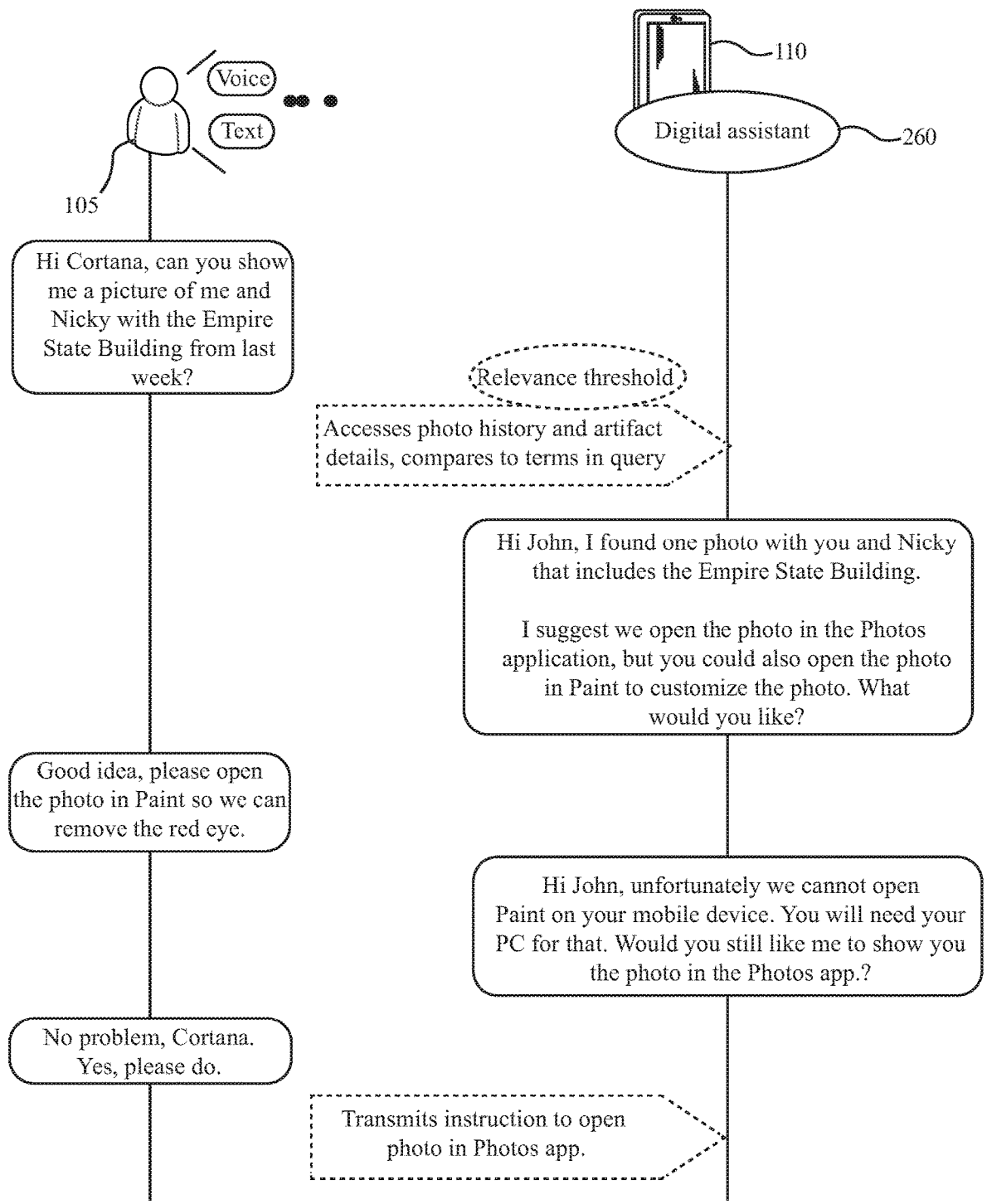

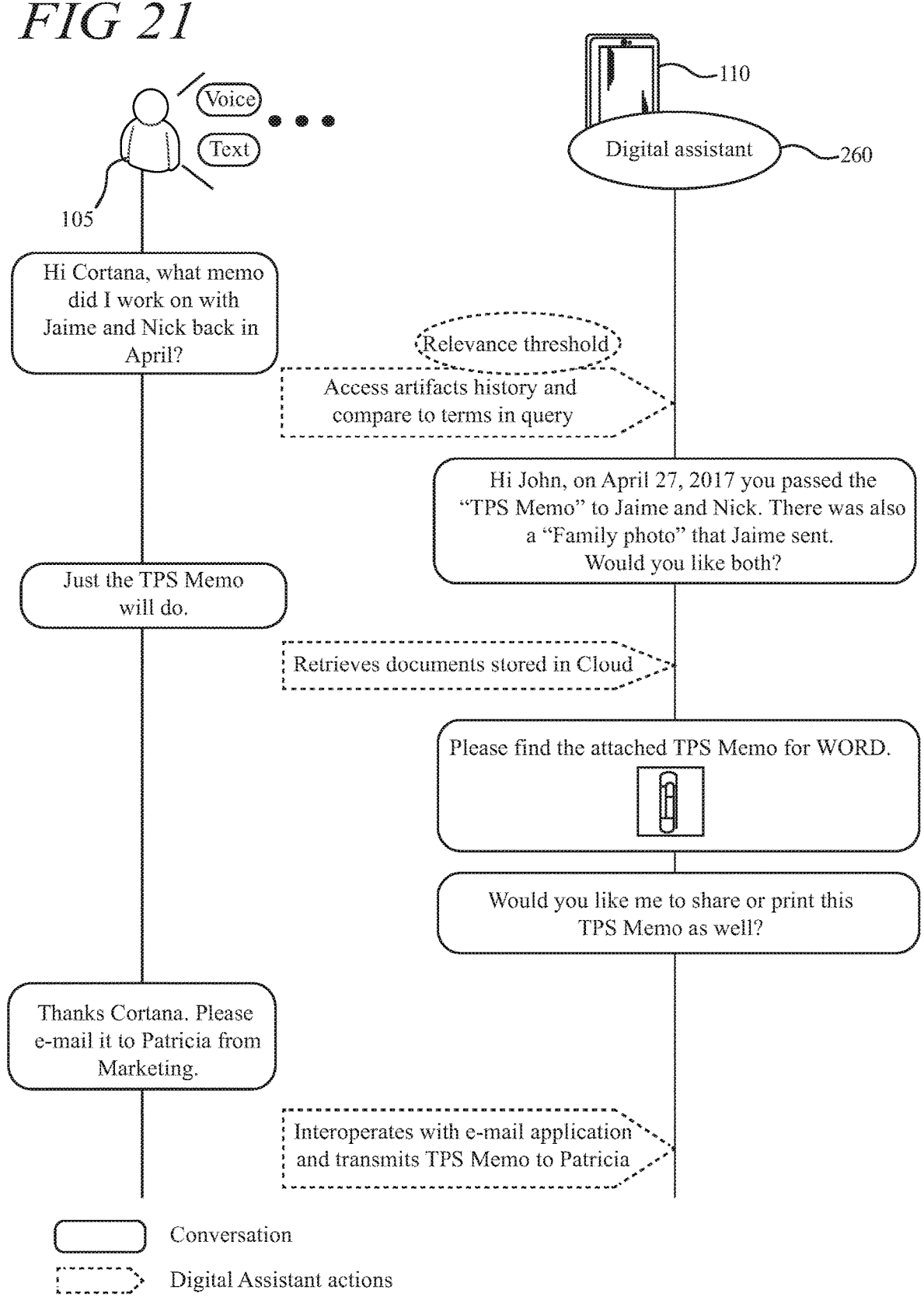

2300

2400

2500

2700

TASK CREATION AND COMPLETION WITH BI-DIRECTIONAL USER INTERACTIONS

BACKGROUND

Computing devices can receive various inputs and requests from users to perform certain tasks and functions. These tasks and functions can include searching the web, messaging, setting calendar appointments, capturing images and videos, etc. Sometimes users may wish to later access and take actions on information that relates to the previously performed functions.

SUMMARY

A digital assistant supported on a computing device such as a smartphone, tablet, personal computer (PC), and the like is configured to create and store artifacts associated with performed actions, and identify and analyze stored artifacts in response to a request of a device user. The user typically uses various applications on the device to perform an action, participate in an event, or implement some functionality such as searching the web, taking a photograph, making voice and video calls, and sending and receiving messages (e.g., e-mail, text, social media, etc.). The digital assistant interoperates with the respective applications, such as a web browser, camera application, calling application, and messaging application, to create and store artifacts, including objects and/or data, which are associated with the action, event, or function. For example, artifacts may include the results of a web search or the participants in a messaging session or call. At a later time, the user may interact with the digital assistant so that a particular stored artifact is identified and analyzed (such identification and analysis can be performed dynamically in real time or using offline processes). For example, the user may request the digital assistant identify the participants in a recent teleconference. In response to the request, the digital assistant analyzes stored artifacts to identify the relevant teleconference and provide the teleconference participants to the user. The digital assistant can also provide suggestions to the user for follow-up actions based on the artifacts, such as sending a message to the teleconference participants.

In an illustrative embodiment, the user performs a web search using a browser exposed on a smartphone to get information about ants. Later when the user plans to write a school report on the ants, the user asks the digital assistant, "When I searched last week, what were the results for how much weight an ant can lift?" Because the digital assistant created and stored various artifacts associated with the earlier web search (e.g., websites visited, content on websites, date and time of search, etc.), the digital assistant can identify relevant information from the stored artifacts. The digital assistant may then provide the user with information in response to the request. For example, the digital assistant can respond with an answer (e.g., "Based on one website, an ant can lift up to 5,000 times their weight"), identify websites that contain responsive information, or enable the user to navigate to particular websites through interactions including voice, text, or gestures.

The digital assistant may further provide suggestions for follow-up activities to the user based on web search artifacts. For example, the suggestion may include the digital assistant e-mailing the websites to the user, opening the websites in the web browser, sharing the websites (e.g., on social media, e-mail, text, etc.) or saving a text/word document with the responsive content (e.g., ants can lift up to 5,000 times their weight.)

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 12A-B show illustrative artifacts that are identified based on the user's web search of FIG. 7;

FIG. 13 shows illustrative identifiable artifacts when the user captures an image or video;

FIG. 15 shows illustrative identifiable artifacts when the user interacts with other parties over communication applications;

FIG. 18 shows illustrative artifacts that are identified based on the usage of the map application of FIG. 10;

FIGS. 20A-B show an illustrative user interaction with the digital assistant based on the identified artifacts of FIG. 14;

FIG. 21 shows an illustrative user interaction with the digital assistant based on the identified artifacts of FIG. 16;

Like reference numerals indicate like elements in the drawings. Elements are not drawn to scale unless otherwise indicated.

DETAILED DESCRIPTION

Figure 1:
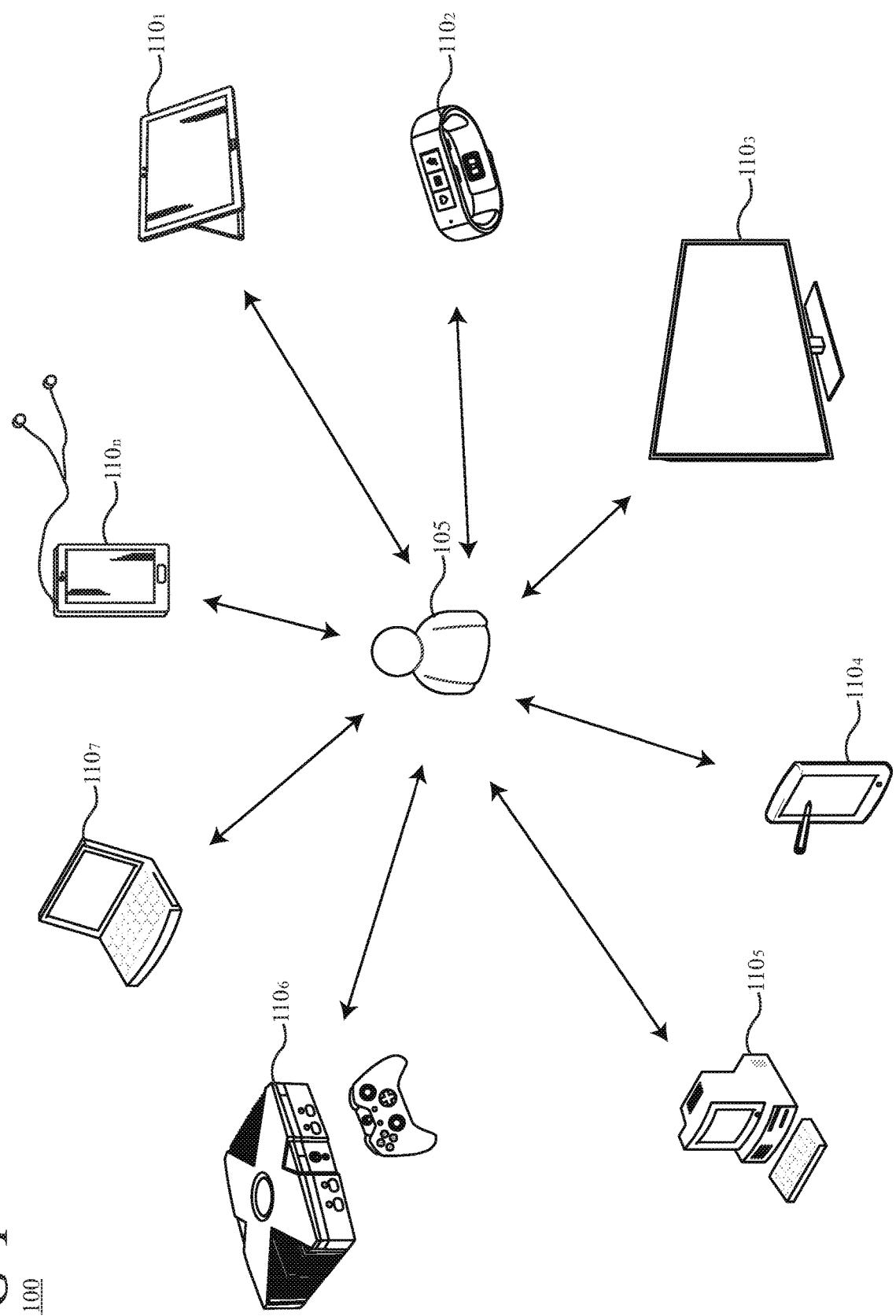
FIG. 1 shows illustrative computing devices associated with a user.

FIG. 1 shows an illustrative environment 100 in which a user 105 is associated with various computing devices 110. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., using text messaging or social media applications) and e-mail communications, use applications and access services that employ data, browse the World Wide Web, and the like.

Other types of electronic devices are also envisioned to be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computers, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to a network.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited UI (User Interface). Some devices may support video consumption and Internet browsing, while other devices may support more limited media handling and network interface features.

Figure 2:
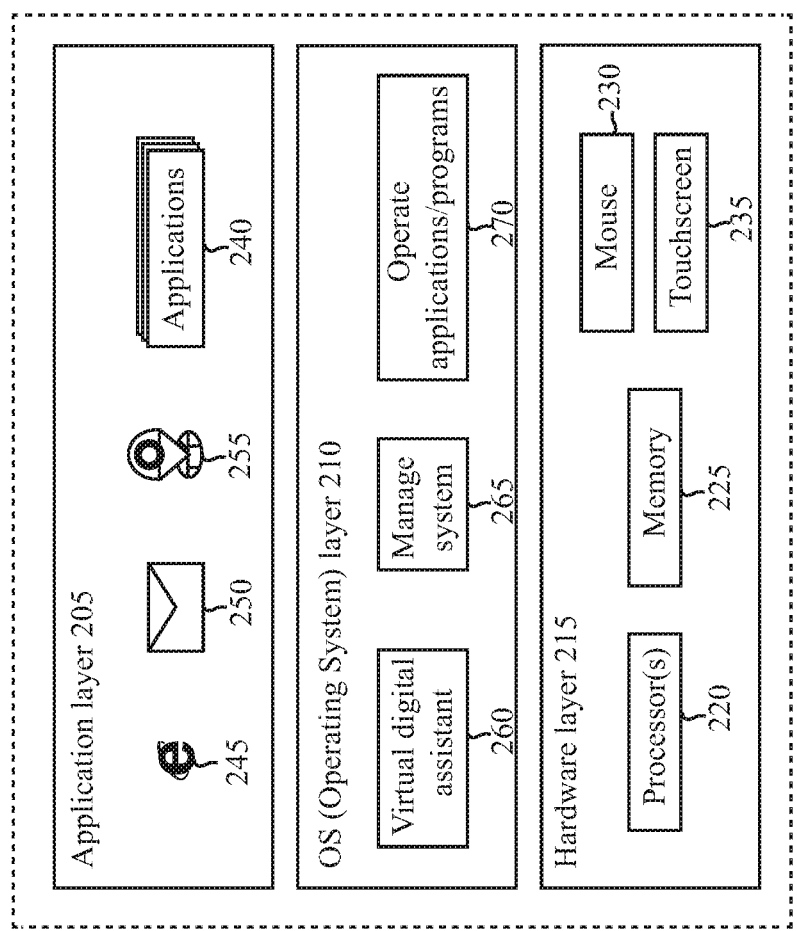
FIG. 2 shows an illustrative system architecture of the computing devices.

FIG. 2 shows an illustrative layered architecture 200 that may be instantiated on a given device 110. The architecture 200 is typically implemented in software, although combinations of software, firmware, and/or hardware may also be utilized in some cases. The architecture 200 is arranged in layers and includes an application layer 205, an OS (operating system) layer 210, and a hardware layer 215. The hardware layer 215 provides an abstraction of the various hardware used by the device 110 (e.g., input and output devices, networking and radio hardware, etc.) to the layers above it. In this illustrative example, the hardware layer supports processor(s) 220, memory 225, mouse 230, and touchscreen 235. Other input mechanisms are also possible, such as a microphone and keyboard.

The application layer 205 in this illustrative example supports various applications 240, including a web browser 245, e-mail application 250, map application 255, etc. Although only certain applications are depicted in FIG. 2, any number of applications can be utilized by the device, including calendar, contacts, news, fitness, etc. The applications are often implemented using locally executing code. However in some cases, these applications can rely on services and/or remote code execution provided by remote servers or other computing platforms such as those supported by a service provider or other cloud-based resources.

The OS layer 210 supports the digital assistant 260, manages system 265, and operates applications/programs 270, among other operations. The OS layer may interoperate with the application and hardware layers to perform various functions and features.

Figure 3:
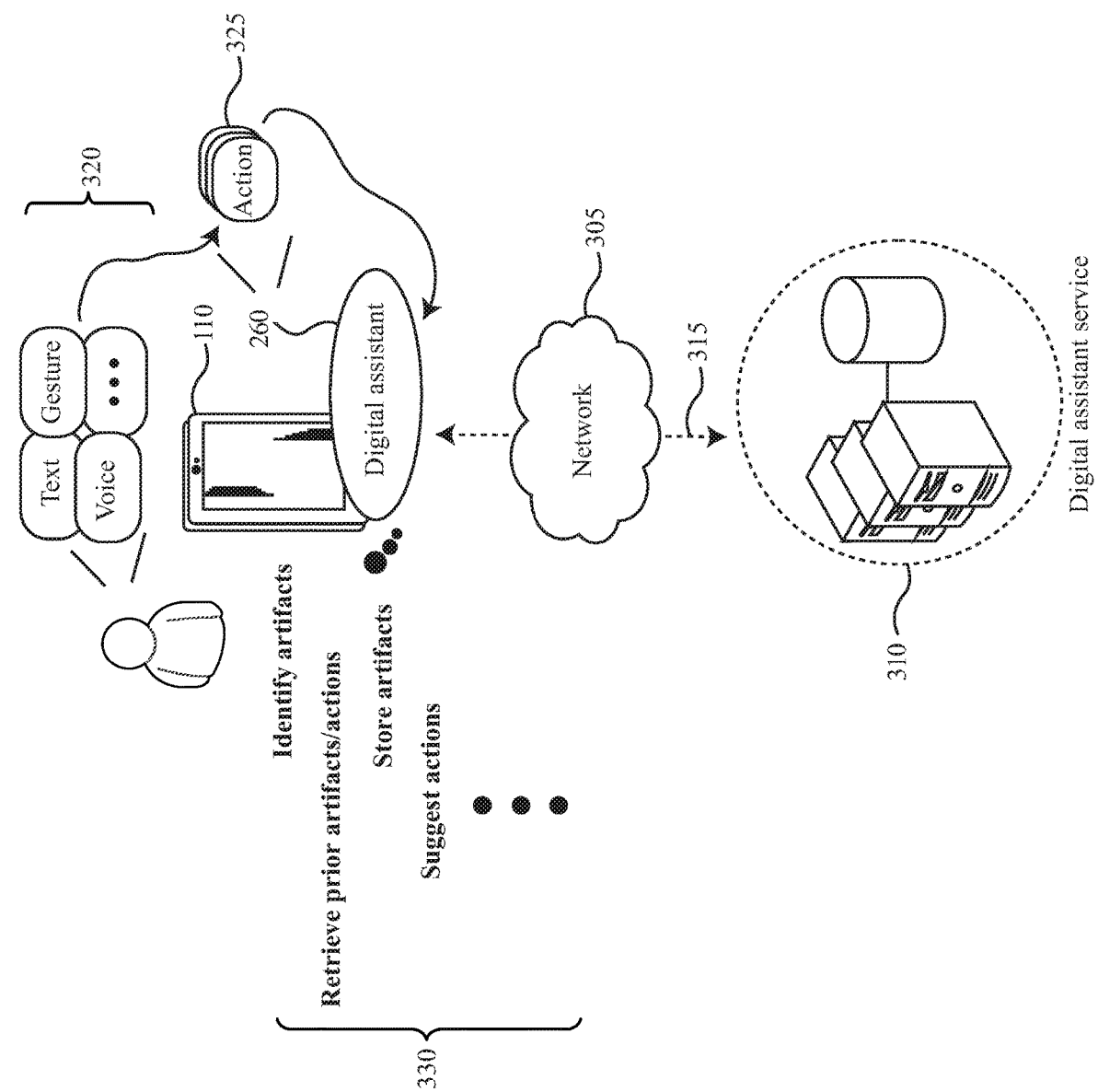
FIG. 3 shows an illustrative environment in which the user interacts with a digital assistant.

As shown in FIG. 3, the device 110 can likewise operate over a network 305 and interact with a digital assistant service 310. The digital assistant may operate locally, remotely, or with a combination of the two through various interactions, as shown by line 315. For example, the digital assistant 260 in some implementations can partially utilize or fully utilize remote code execution supported at the service 310, or using other remote resources. In addition, it may utilize and/or interact with the other OS components and operations (and/or other components that are instantiated in the other layers of the architecture 200) as may be needed to implement the various features and functions described herein.

FIG. 3 further provides an illustrative environment 300 in which the user 105 provides some form of input 320, which causes the device to perform one or more actions 325. The digital assistant then uses the performed action and input to perform various functions 330, such as creating, analyzing and identifying, storing artifacts, retrieving artifacts/actions, and making suggestions. Accordingly, the digital assistant may interoperate with the various applications (FIG. 2) that operate on the user's device to retrieve, utilize, and perform various operations based on the user's actions with the applications.

The service 310 may be utilized to perform all of the functions 330 as well, and collaborates with the digital assistant 260 stored on the device 110. In one illustrative embodiment, the service 310 may at least store identified artifacts so that the user is able to utilize the functions 330 across all devices 110. Specifically, artifacts that are associated with actions performed on a smartphone device, for example, may be stored within a database associated with service 310. The stored artifacts may be accessible by the user's tablet computer or any other device 110 (FIG. 1), so that all the user's devices can respond to user queries and perform the digital assistant operations discussed herein.

Figure 4:
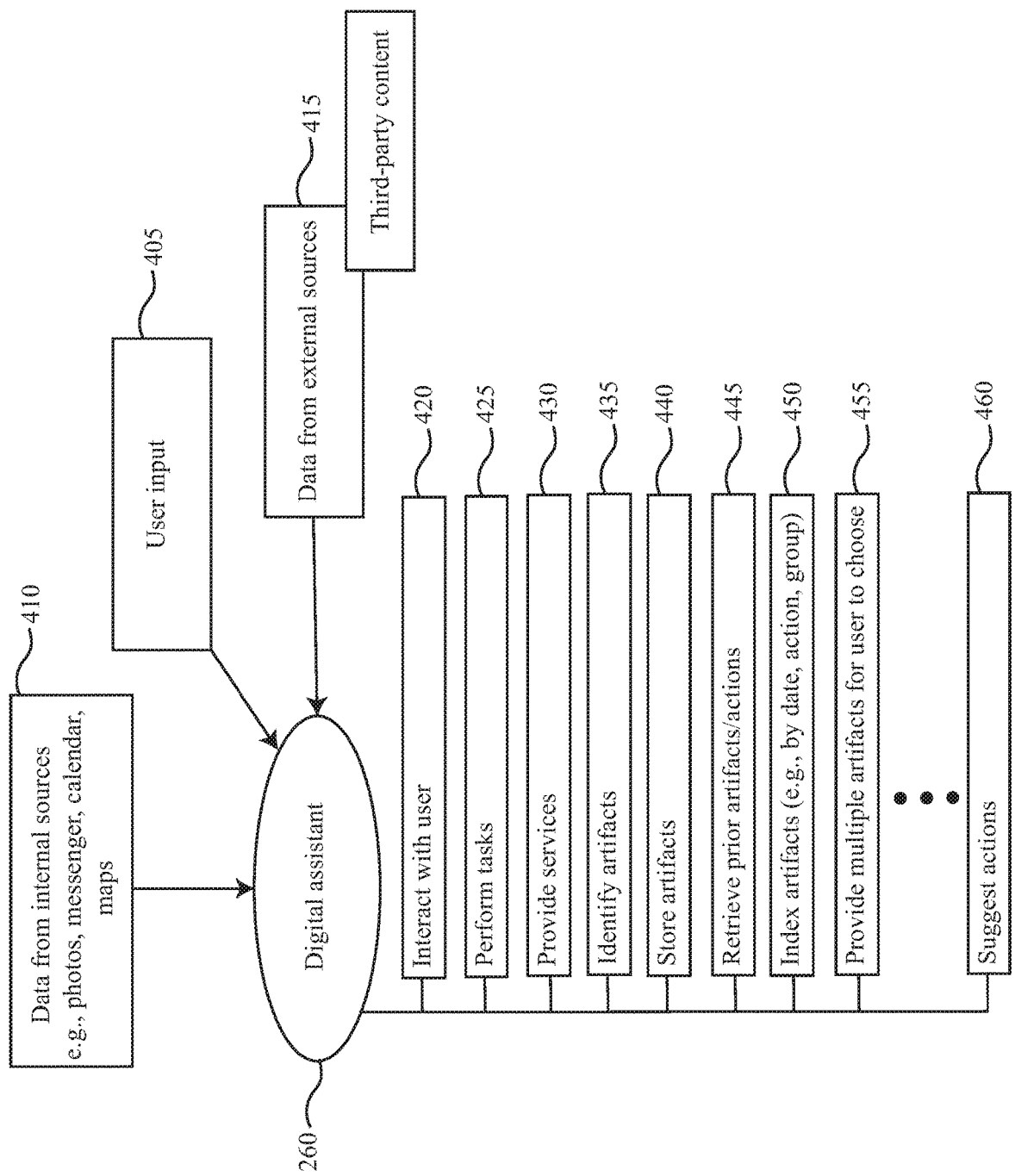
FIG. 4 shows illustrative functions and capabilities of the digital assistant.

FIG. 4 shows an illustrative taxonomy of functions 400 that may typically be supported by the digital assistant 260 either natively or in combination with an application 240 (FIG. 2). Inputs to the digital assistant 260 typically can include user input 405, data from internal sources 410, and data from external sources 415 which can include third-party content 418. For example, data from internal sources 410 could include the current location of the device 110 that is reported by a GPS (Global Positioning System) component on the device, or some other location-aware component. The externally sourced data 415 includes data provided, for example, by external systems, databases, services, and the like.

As shown, the functions 400 illustratively include interacting with the user 420 (through the natural language UI and other graphical UIs, for example); performing tasks 425 (e.g., making note of appointments in the user's calendar, sending messages and e-mails, etc.); providing services 430 (e.g., answering questions from the user, mapping directions to a destination, setting alarms, forwarding notifications, reading emails, news, blogs, etc.); identifying artifacts 435 (e.g., objects, data, or metadata associated with an action/function); storing artifacts 440; retrieving prior artifacts and actions 445; indexing artifacts 450 (e.g., by date, by group, based on action/function performed, etc.); providing multiple artifacts for the user to choose from 455 (e.g., multiple images, multiple documents, multiple restaurant names, multiple people's names, etc.); and suggesting actions 460 (e.g., open an application, share content on social media or through message, print document, etc.).

A user can typically interact with the digital assistant 260 in a number of ways depending on the features and functionalities supported by a given device 110. For example, the digital assistant 260 may expose a tangible user interface that enables the user 105 to employ physical interactions in support of user experiences on the device 110. Such physical interactions can include manipulation of physical and/or virtual controls such as buttons, menus, keyboards, etc., using touch-based inputs like tapping, flicking, dragging, etc. on a touchscreen, and the like. Alternatively, the user interactions may occur through voice, such as the user interacting with a microphone on the device, and the device responding either through audio commands, or visual commands displayed on the UI.

Figure 5:
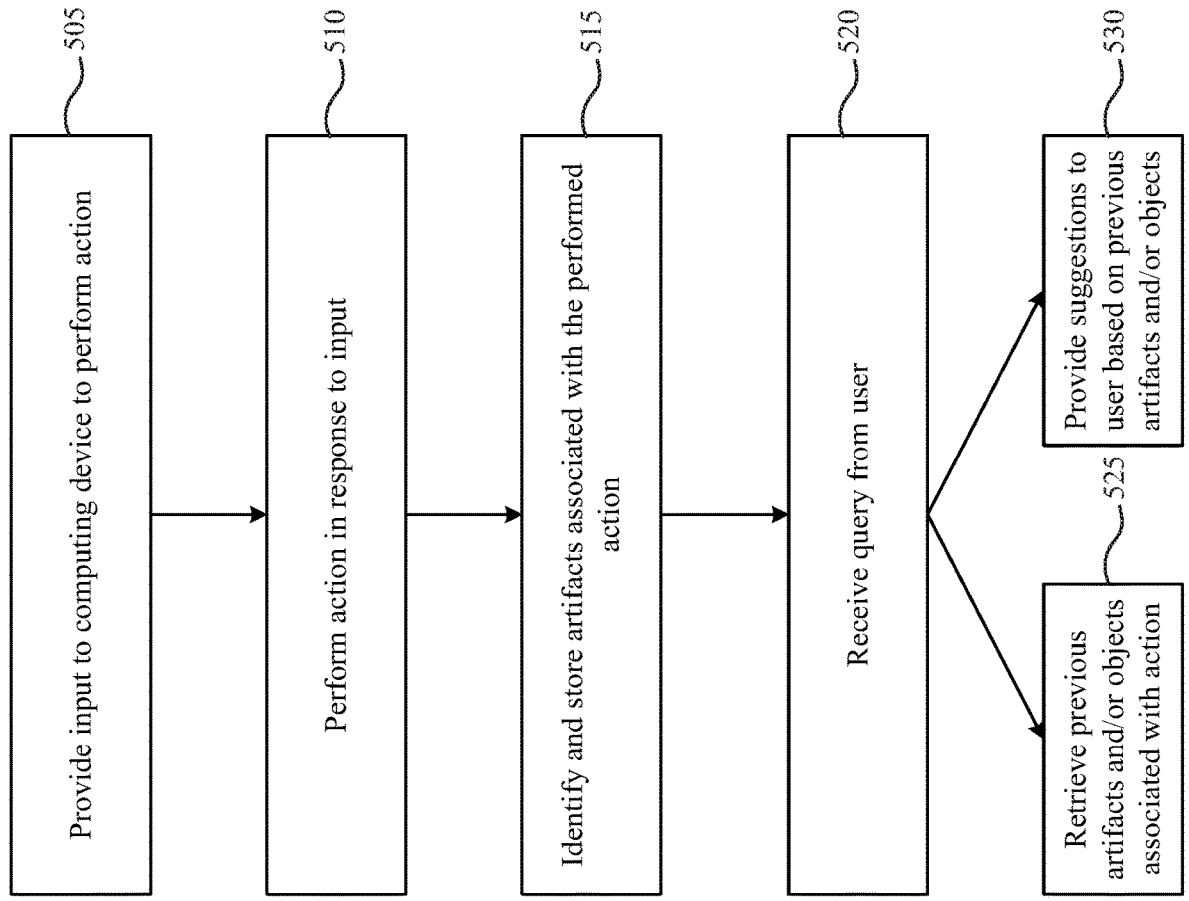
FIG. 5 shows illustrative processes performed by the device.

FIG. 5 shows an illustrative process 500 that provides an overview of the present task creation and completion with bi-directional user interactions. At step 505 the device may receive input from a user to perform a certain action or function (e.g., web search, e-mail, get directions, etc.). In response, at step 510, the device may perform the action or function (e.g., send the e-mail, search the web, provide directions to user). At step 515 the digital assistant may identify and store artifacts based on the user input and the performed action. The artifacts can include, for example, search results in a web search, recipients of the e-mail, documents/attachments associated with the e-mail, name of desired location in map application, etc.

The artifact identification can include analysis of user input and actions as well as actions and behaviors of applications, operating system, and device components. The digital assistant or other suitable system may dynamically perform the analysis with the occurrence of inputs, actions, and behaviors using real time processes. Alternatively, the artifact identification can be performed using offline analytical processes. A mix of real time and offline processing may also be utilized in some implementations.

At step 520, the user may query the digital assistant for a stored artifact which was previously stored and based on the previously performed action/function (e.g., who participated in yesterday's meeting). At step 525, the digital assistant may retrieve and provide the user with responsive artifacts, that is, artifacts that are responsive to the user's query. For example, if the user queried the digital assistant for the participants in yesterday's meeting, the digital assistant may identify the participants (e.g., Tom, John, and Joe). As another example, if the user queried the digital assistant for a particular document that the user e-mailed last week, the digital assistant may identify the document as an artifact.

Furthermore, at step 530 the digital assistant may provide the user with one or more suggestions based on one or more of the retrieved artifact or the query from the user. The suggestion can include opening an attachment with a particular program (e.g., word processing application), opening a website in a web browser based on a prior web search, etc.

Figure 6:
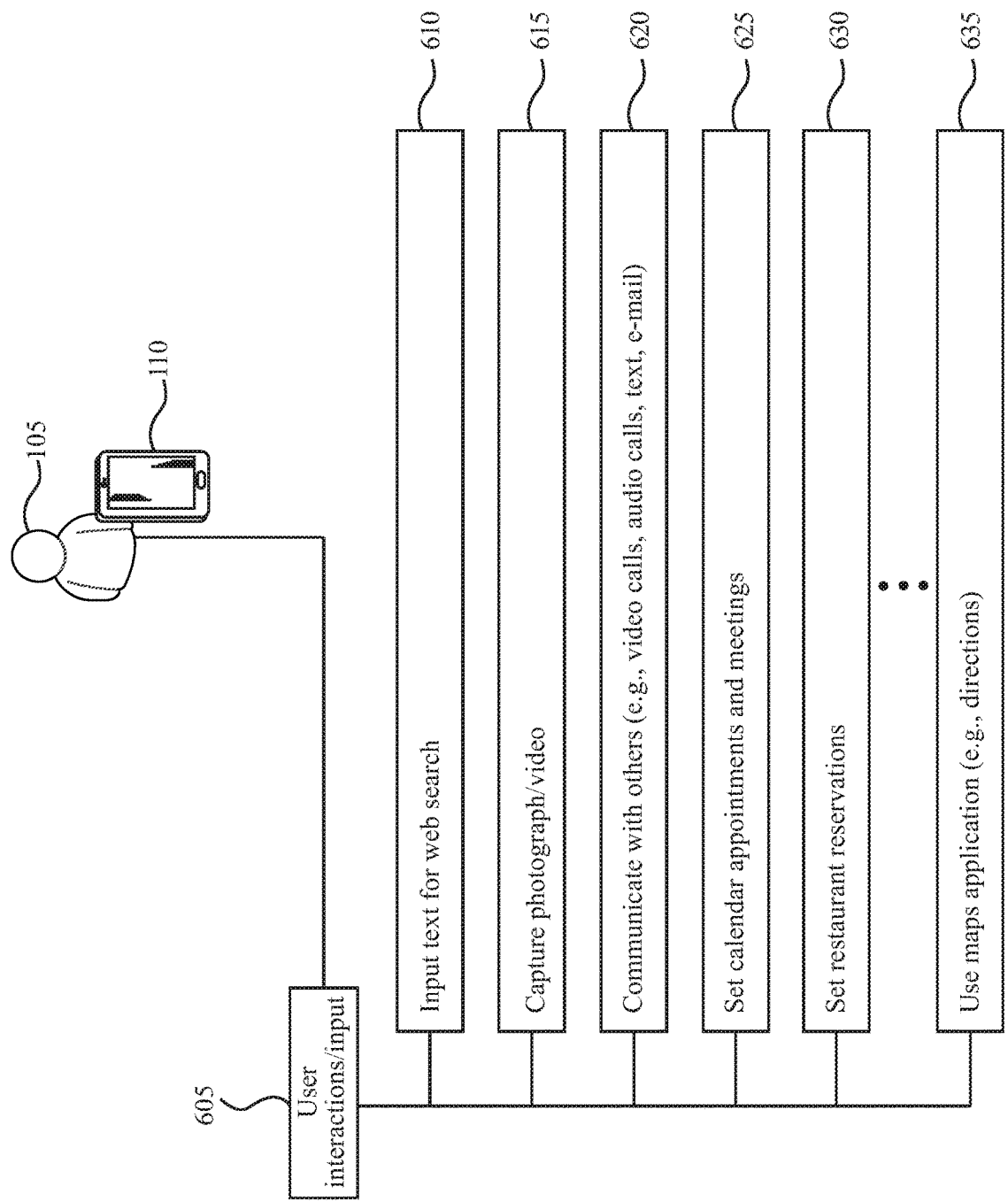
FIG. 6 shows illustrative input to the device from a user.

FIG. 6 provides a taxonomy 600 of user interactions or input 605 with the device 110, which may, for example, coincide with step 505 in FIG. 5. The various user interactions or input may cause the device to perform a particular function. For example, the user interactions can include inputting text for a web search 610, capturing image/video 615, communicating with others (e.g., video calls, audio calls, text, e-mail) 620, setting calendar appointments or meetings 625, setting restaurant reservations 630, or using a map application (e.g., finding places/establishments, getting directions) 635.

Figure 7:
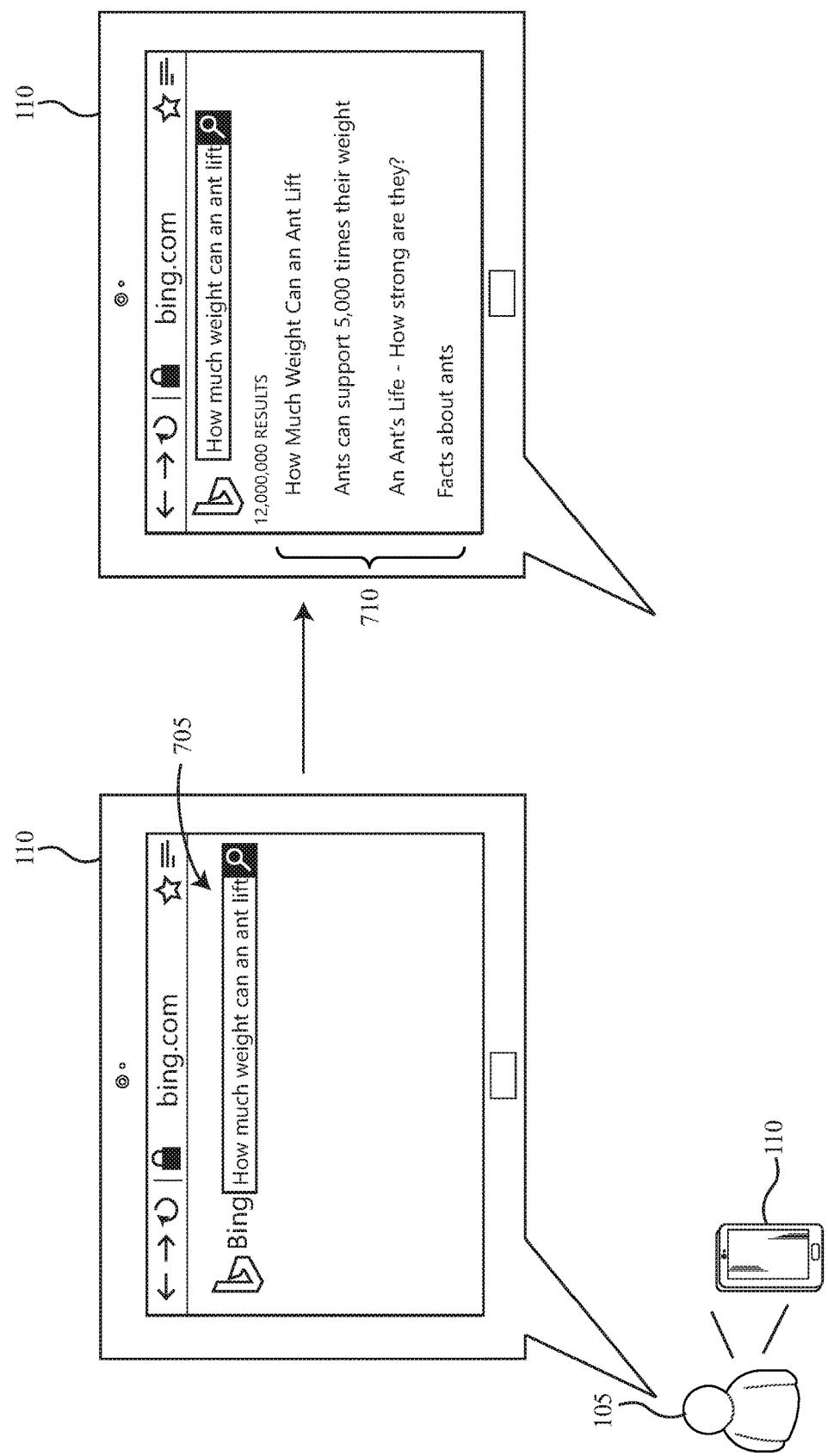
FIG. 7 shows an illustrative action in which the user performs a web search on the device.

FIGS. 7-10 show various exemplary scenarios of some of the user interactions described with respect to FIG. 6. FIG. 7 shows an exemplary scenario 700 in which the user 105 inputs text (through text, voice, or gesture, for example) for a web search in a web browser application using the Bing® search engine. Specifically and as shown on the left device, the user input "How much weight can an ant lift" 705. The right device then provides an illustrative display of four search results 710.

Figure 8:
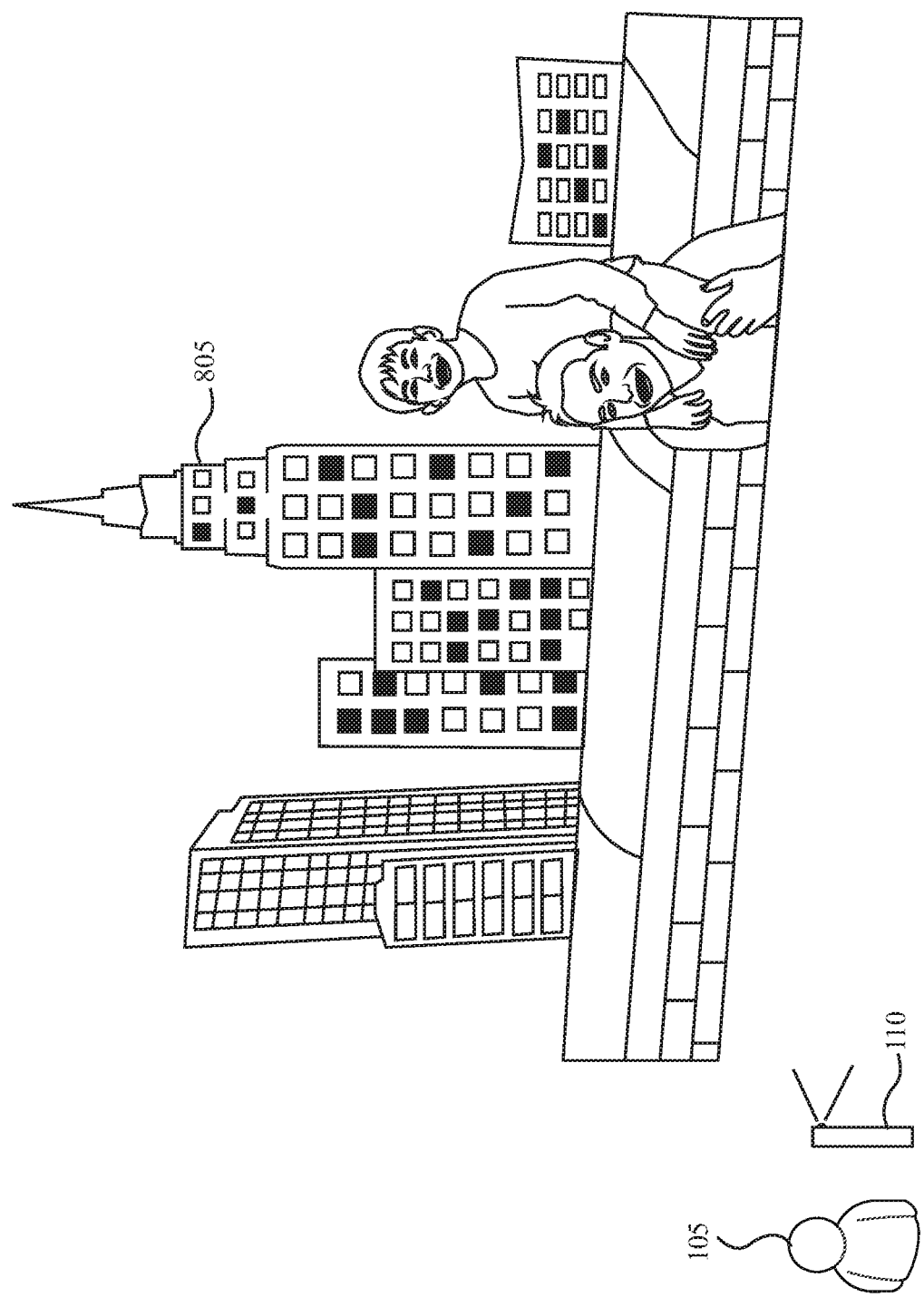
FIG. 8 shows an illustrative action in which the user captures an image.

FIG. 8 shows an illustrative scenario 800 in which the user 105 captures an image. In this illustrative example the camera on the user's device 110 captures a father and son portrait with the Empire State Building® 805 in the background.

Figure 9:
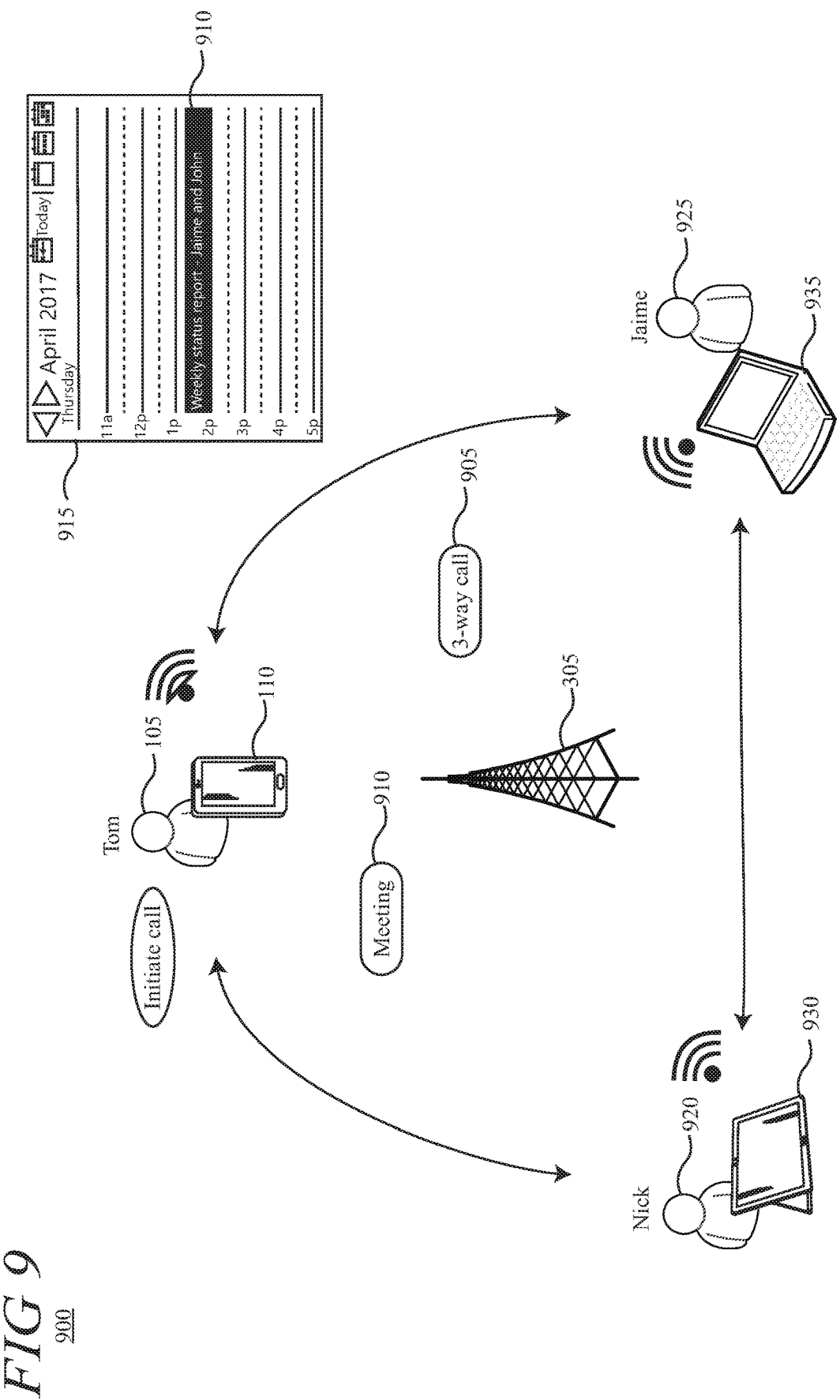
FIG. 9 shows an illustrative action in which the user participates in a three-way call according to an appointment in the user's calendar.

FIG. 9 shows an illustrative scenario 900 in which three users are involved in a three-way call 905 for a scheduled meeting 910. The user's calendar 915 depicts the scheduled meeting 910 at 1:15 p.m. as well. In this scenario, the participants include user 105, whose name is Tom, Nick 920, and Jaime 925. Tom 105 may operate device 110 and Nick and Jaime operate devices 930 and 935, respectively. The call may be communicated over network 305. In this example the three-way call may be a telephone call using a cellular tower, but the meeting may also be in text (e.g., e-mail, text message), or video call using, for example, VoIP (Voice over Internet Protocol) over the Internet. The meeting may also be any combination of various messaging platforms, such as a video call platform that also provides the ability to transmit documents, text, etc.

Figure 10:
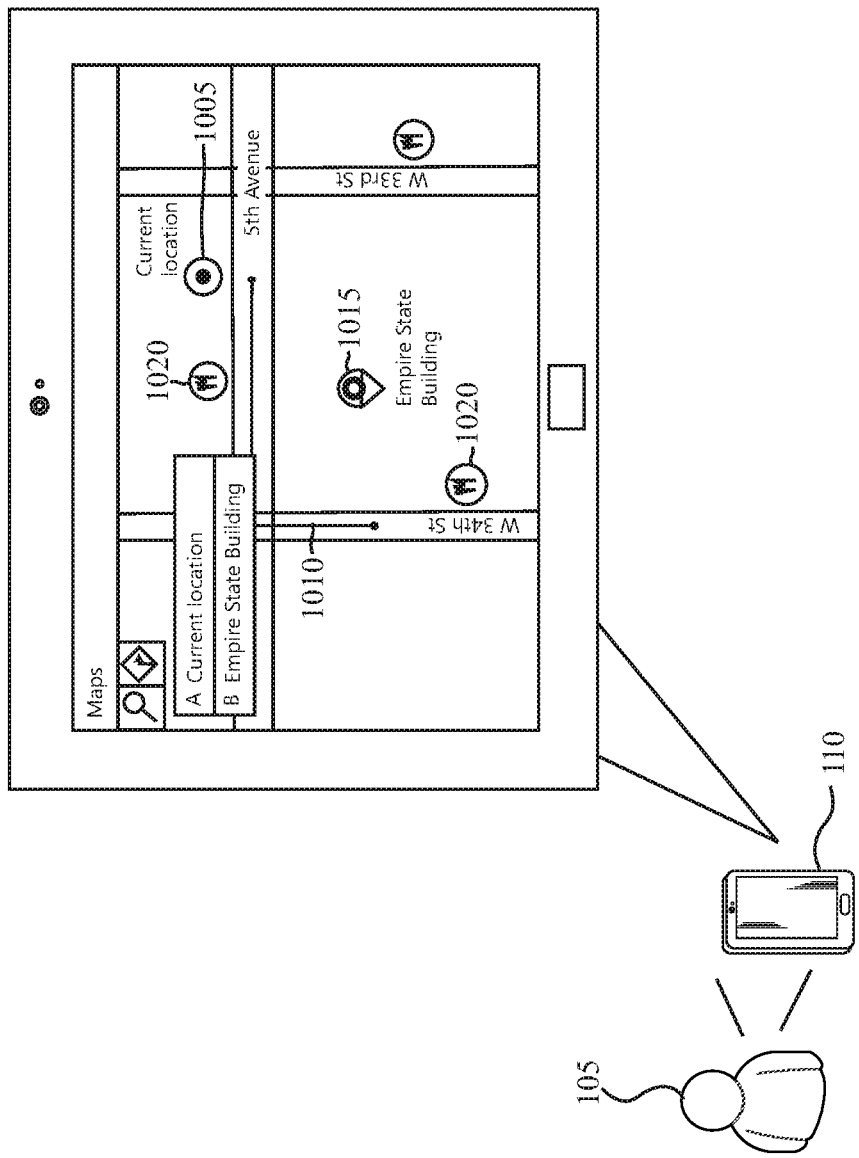
FIG. 10 shows an illustrative action in which the user obtains directions from a map application.

FIG. 10 shows an illustrative scenario 1000 in which the user 105 utilizes the map application instantiated on his device. Specifically, the user inputs the Empire State Building® to find step-by-step directions. The map depicts the user's current location 1005 and a route 1010 to travel to the Empire State Building® 1015. In addition, the virtual map shows various food establishments (e.g., fast food, restaurants, etc.) 1020 that are nearby to the user.

After the user provides various interactions/inputs into device 110, the digital assistant may identify artifacts associated with the actions performed by the device. FIGS. 11-18 provide various examples and scenarios of artifacts that the digital assistant is configured to identify, namely based on the interactions shown in FIGS. 7-10. The identified artifacts shown in FIGS. 11-18 are exemplary, and additional artifacts may also be identified by the digital assistant based on the configurations of the software, context of the given situation, etc.

Figure 11:
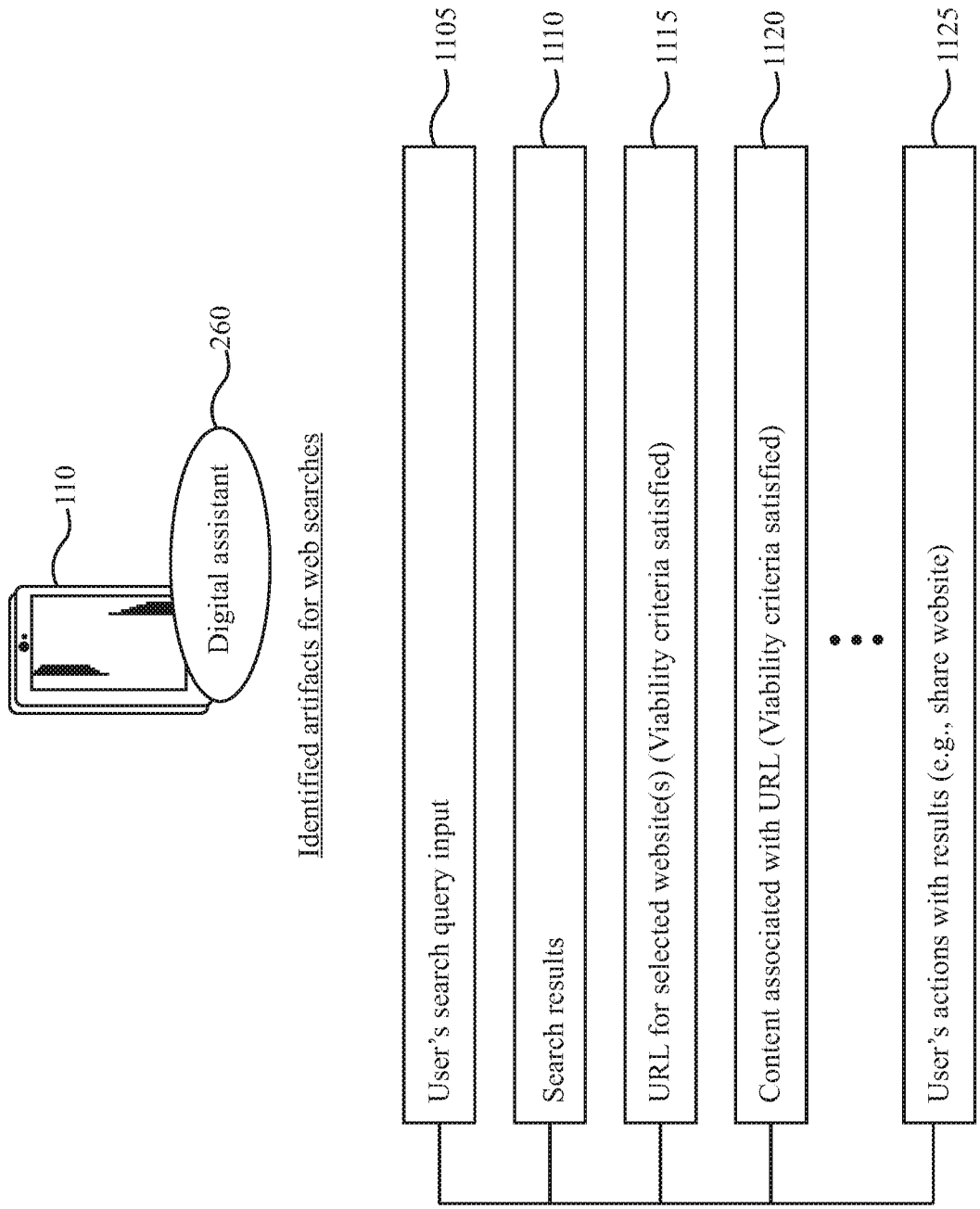
FIG. 11 shows illustrative identifiable artifacts when the user performs a web search.

FIG. 11 provides a taxonomy 1100 of identified artifacts when the user performs a web search. For example, artifacts may include the user's search query input 1105, search results 1110, URL (Uniform Resource Locator) for selected website(s) 1115, content associated with the URL 1120, or user's actions with results (e.g., share website with e-mail) 1125.

FIGS. 12A-B show an illustrative scenario in which the digital assistant identifies various artifacts based on the user's web search of FIG. 7. For example, FIG. 12A graphically shows identified artifacts in dashed lines 1205. Specifically, the digital assistant identified the user's search query and one of the search results from the search engine.

FIG. 12B shows an illustrative website which the user selected from FIG. 12A. In this example, the digital assistant identifies various artifacts on the website, such as content information and the title of the web page. In addition, the digital assistant identifies the date 1210 that the user performed that particular web search.

The digital assistant may have identified the particular search result in FIG. 12A because the user selected it (e.g., mouse click). Alternatively, the digital assistant may store all web results as artifacts or use an intelligent algorithm to generate artifacts that are most relevant to the user's search. For example, the digital assistant may compare the amount of "like-words" between the user's search, the title of the search results, and the content within the respective results. Based on this comparison, the digital assistant may intelligently identify the most relevant objects or data as artifacts.

FIG. 13 provides a taxonomy 1300 of artifacts associated with the user capturing an image or video. For example, artifacts may include people (e.g., facial recognition) 1305, landmarks (e.g., Empire State Building®, Statue of Liberty) 1310, locations (e.g., park, store, restaurant, movies, stadium) 1315, date and time image was taken 1320, objects (e.g., documents, word recognition, types of food, baseball, mitt) 1325, user emotions (e.g., smiley, angry, goofy) 1330.

Figure 14:
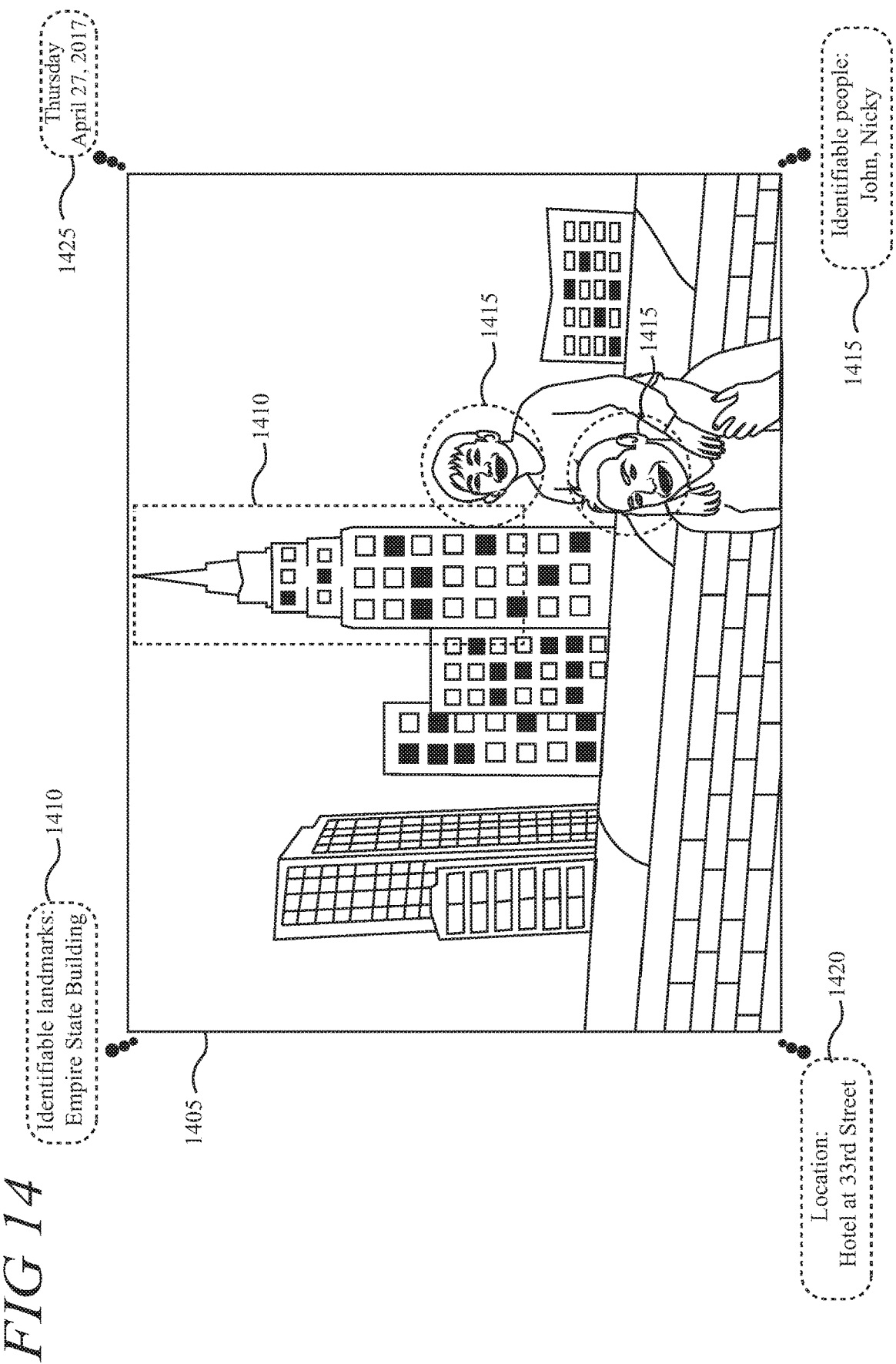
FIG. 14 shows illustrative artifacts that are identified based on the user's image of FIG. 8.

FIG. 14 shows an illustrative image 1405 based on the image taken in FIG. 8. The dashed lines illustrate graphical depictions of artifacts that are identified by the digital assistant. In this example, the digital assistant identifies the Empire State Building® 1410, users John and Nicky 1415, and that the user's location is at or about a hotel on 33$^{rd}$ Street 1420 in New York City. The digital assistant also identifies the date 1425 the image was taken, that is, Thursday, Apr. 27, 2017.

FIG. 15 provides a taxonomy 1500 of artifacts that may be identified when the user interacts or communicates with other parties (e.g., phone call, text, e-mail, video call). For example, the digital assistant may identify the participants 1505, duration of meeting 1510, topics discussed (e.g., project names, people, places) 1515 (with notice to user and user consent), date and time meeting initiated 1520, and objects transferred or referenced (e.g., documents, images, websites) 1525.

Figure 16:
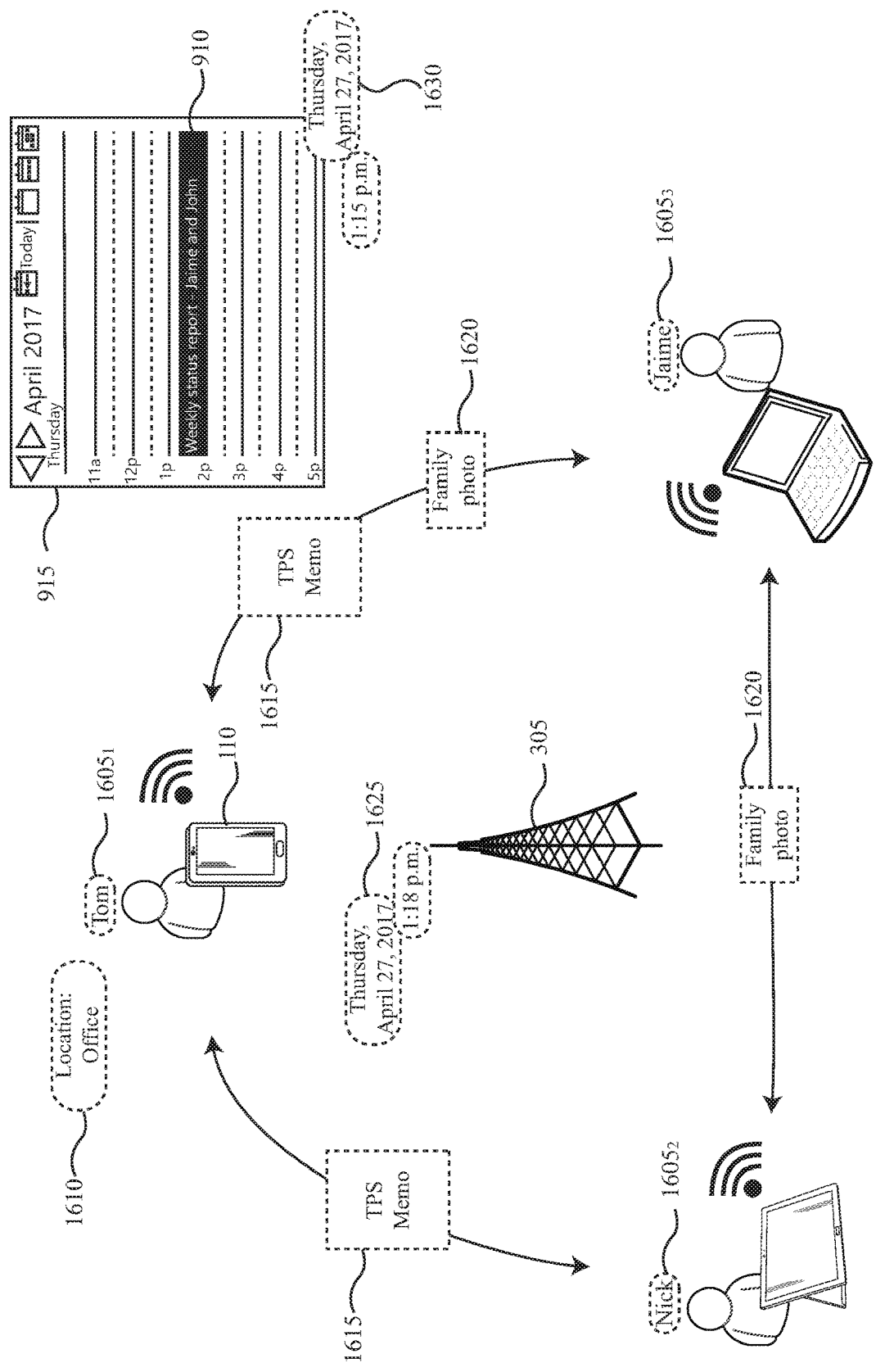
FIG. 16 shows illustrative artifacts that are identified based on the user's three-way communication of FIG. 9.

FIG. 16 shows an exemplary scenario 1600 in which the digital assistant identifies artifacts based on the interaction portrayed in FIG. 9. The dashed lines illustrate graphical depictions of artifacts that are identified by the digital assistant. For example, the digital assistant identifies the participants as Tom, Jaime, and John (collectively represented as 1605) and that Tom was located in his office 1610 at the time. The digital assistant further identifies various objects that were exchanged over network 305 throughout the meeting, such as the TPS Memo 1615 and family photo 1620. In addition, the digital assistant identifies the date and time 1625 that the meeting occurred. Furthermore, the digital assistant may analyze the user's calendar 915 and identify the scheduled time 1630, which was supposed to be for 1:15 p.m. on Apr. 27, 2017, as an artifact. Since the meeting occurred within a threshold time of the scheduled meeting (e.g., the meeting occurred within three minutes of the scheduled time), this may allow the digital assistant to infer that the scheduled meeting was the same meeting as that which occurred at 1:18 p.m. that day.

Figure 17:
FIG. 17 shows illustrative identifiable artifacts when the user uses the map application.

FIG. 17 shows a taxonomy 1700 of artifacts that the digital assistant can identify when the user interacts with a map application on his device 110. For example, the digital assistant can identify location(s) of the device (e.g., address, coordinates, establishment name) 1705, directions history (e.g., current location to desired location) 1710, search history (e.g., Empire State Building®, Microsoft® store) 1715, nearby restaurants 1720, nearby contacts 1725, and date and time of actions (e.g., directions, traveling, places attended) 1730.

FIG. 18 shows an illustrative scenario 1800 in which the digital assistant identifies artifacts based on the user's interaction with the map application of FIG. 10. The dashed lines illustrate graphical depictions of artifacts that are identified by the digital assistant. For example, the user's desired location 1805, the Empire State Building, is identified as an artifact, and various restaurants or other food establishments 1810 have been identified as artifacts. The digital assistant also identified the date and time 1815 based on the current map interaction as an artifact.

FIGS. 19A-22 show various scenarios in which the user interacts with the digital assistant, in this example named Cortana®. The interactions may be queries that are input into the device 110 in the form of a text, voice, or gesture. In these various examples, the digital assistant retrieves artifacts, provides options for the user to choose relevant artifacts, and suggests actions for the user based on the retrieved artifacts.

Figure 19A:
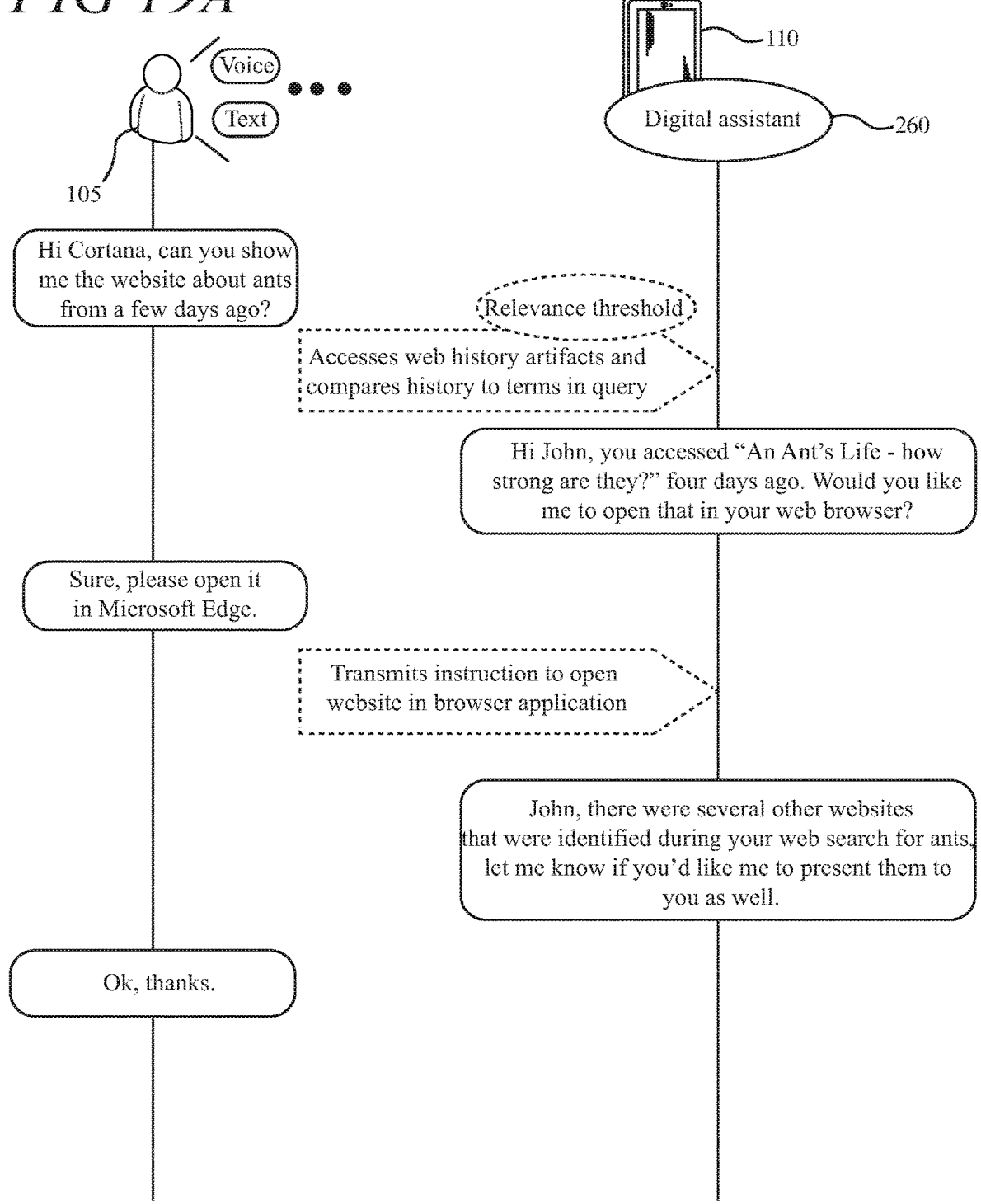
FIGS. 19A-B show an illustrative user interaction with the digital assistant based on the identified artifacts of FIGS. 12A-B.
Figure 19B:
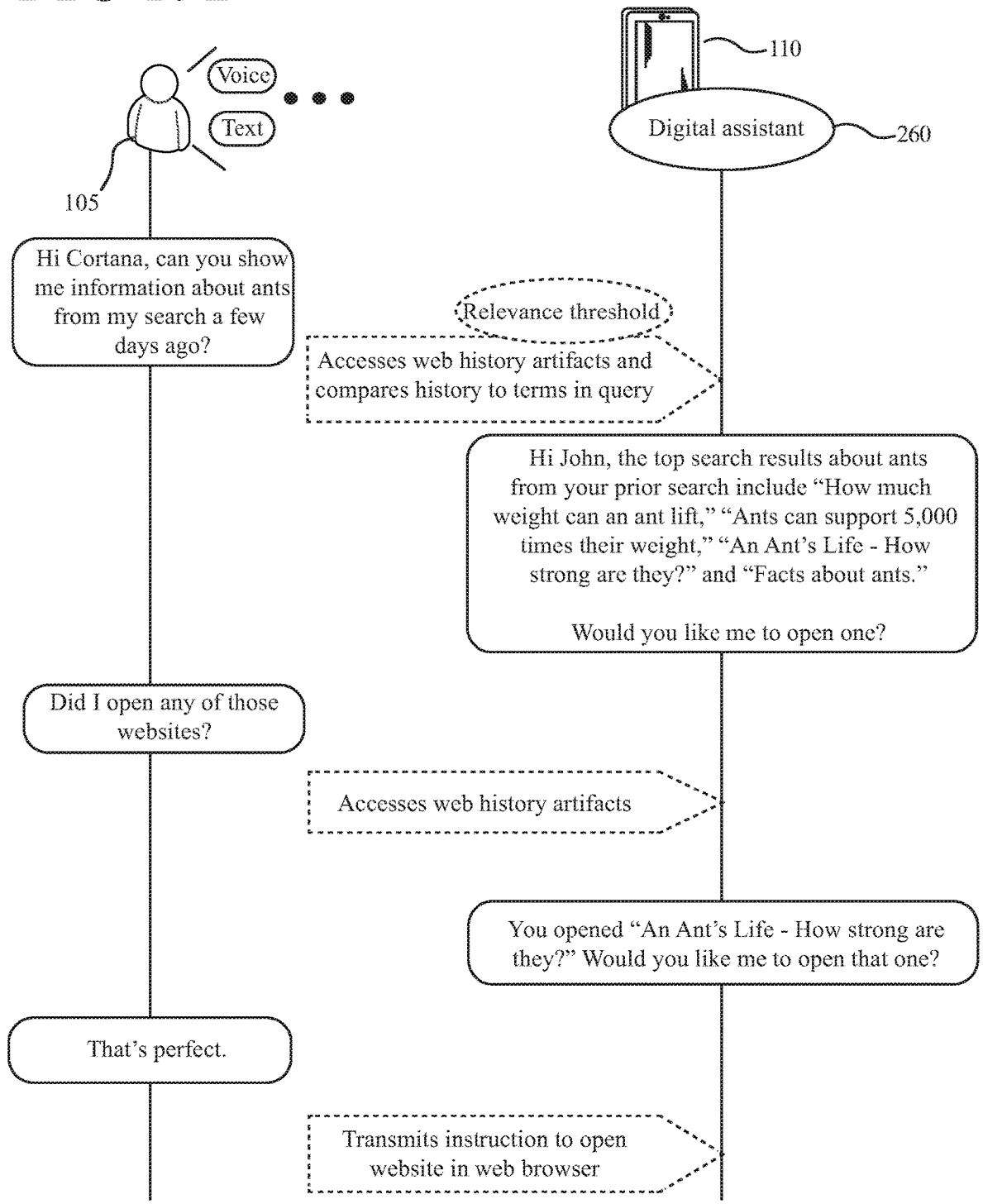

FIGS. 19A-B show an illustrative scenario in which the user asks the digital assistant for information about the website about ants that the user accessed a few days before (FIGS. 7, 12A-B). In FIG. 19A, the digital assistant accesses web history artifacts, identifies the stored website, and asks the user if he would like the website opened in a web browser. The digital assistant may compare terms of the user's query with the history of indexed artifacts, and verify that the comparison satisfies a relevance threshold (e.g., amount of like terms). The digital assistant subsequently opens the identified website in a web browser application, and also informs the user of the other websites.

Referring to FIG. 19B, the user queries the digital assistant for information about ants that the user searched a few days prior (FIGS. 7, 12A-B). In this example, the digital assistant provides the user with a list of the search results stored as artifacts, and informs the user which website the user selected and viewed. The digital assistant, in response to the user's selection, then interoperates with and instructs the web browser to open that particular website.

Figure 20B:
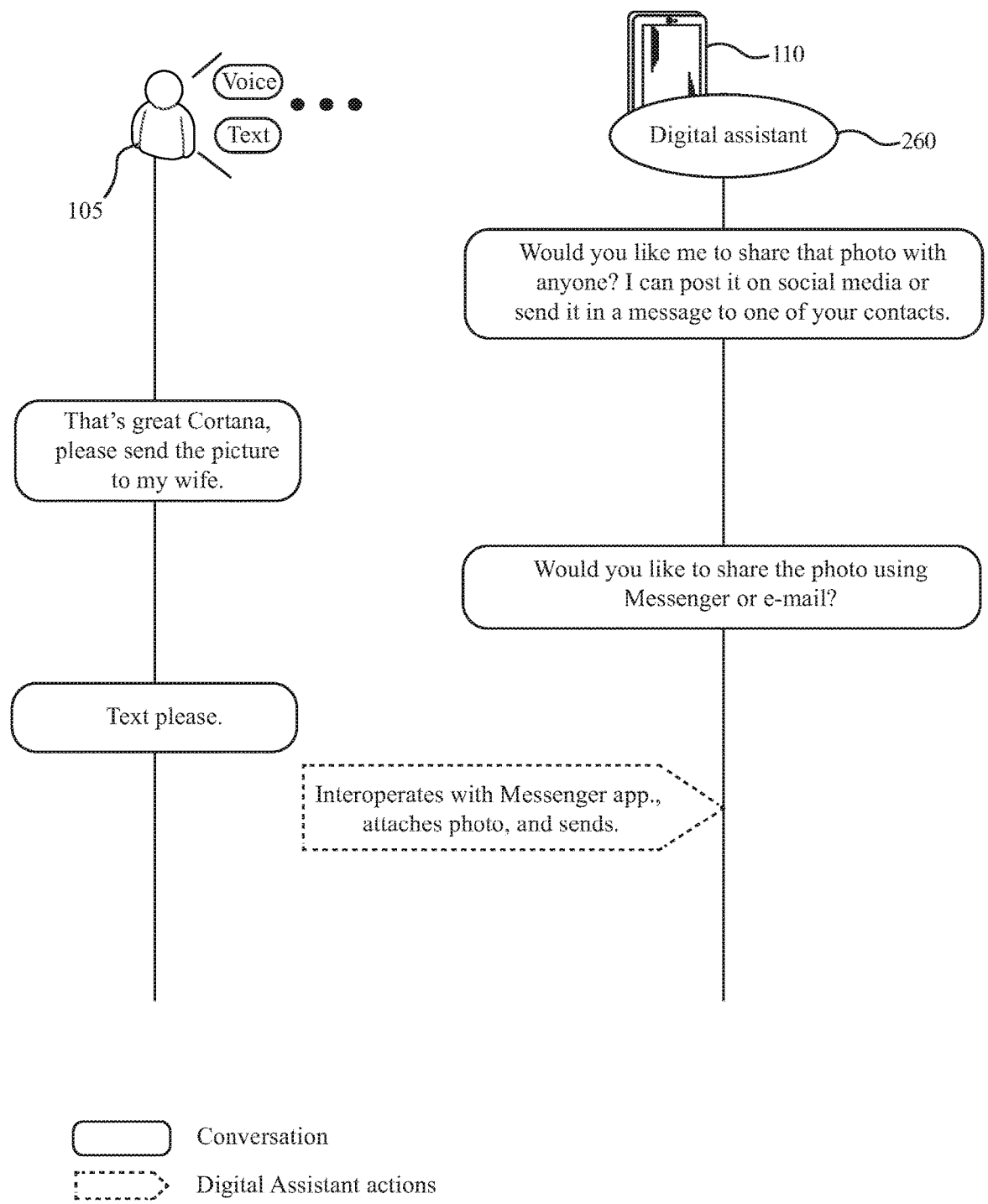

FIGS. 20A-B show an illustrative scenario in which the user asks the digital assistant for information about a picture that was previously captured (FIGS. 8 and 14). Specifically, the user queries the digital assistant for the picture that was captured with the user and Nicky and which contained the Empire State Building® the previous week. The digital assistant accesses and sifts through the artifacts, verifies a relevance threshold is satisfied, locates the image, and suggests to the user that he open the image in a Photo application or a Paint application for customization. In response to the user, the digital assistant recognizes that the user's mobile device does not support the Paint application functionality, and thereby suggests that the user use his PC. The digital assistant then opens the image in the Photo application.

Furthermore, the discussion continues onto FIG. 20B, where the digital assistant suggests and asks the user whether he would like to share the image on social media or with a message application. Upon the user's consent, the digital assistant then interoperates with the messenger application, attaches the image, and sends the image to the user's spouse. The digital assistant may likewise interoperate with the user's contact information stored on the device or remotely to identify the proper recipient, in this example, the user's spouse.

FIG. 21 shows an illustrative scenario in which the user asks the digital assistant for information about the meeting that was previously conducted (FIGS. 9 and 16). Specifically, the user asks the digital assistant which memo was discussed during the meeting with Nick and Jaime in April. The digital assistant then accesses the stored artifacts, verifies that compared terms satisfy a relevance threshold, and identifies that the participants in the meeting discussed the TPS Memo and a family photo. Thus, the digital assistant provides the user with the option to choose the particular artifact that the user wants.

The user responds that he only needs the TPS Memo, in which the digital assistant accesses and provides the user with the memo as an attachment. The digital assistant further provides the user with a suggestion to either share or print the TPS memo. Upon the user's direction, the digital assistant then interoperates with the e-mail application, attaches the TPS Memo, and transmits it to Patricia. The digital assistant may have also interoperated with the contacts application to identify Patricia's details (e.g., e-mail address).

Figure 22:
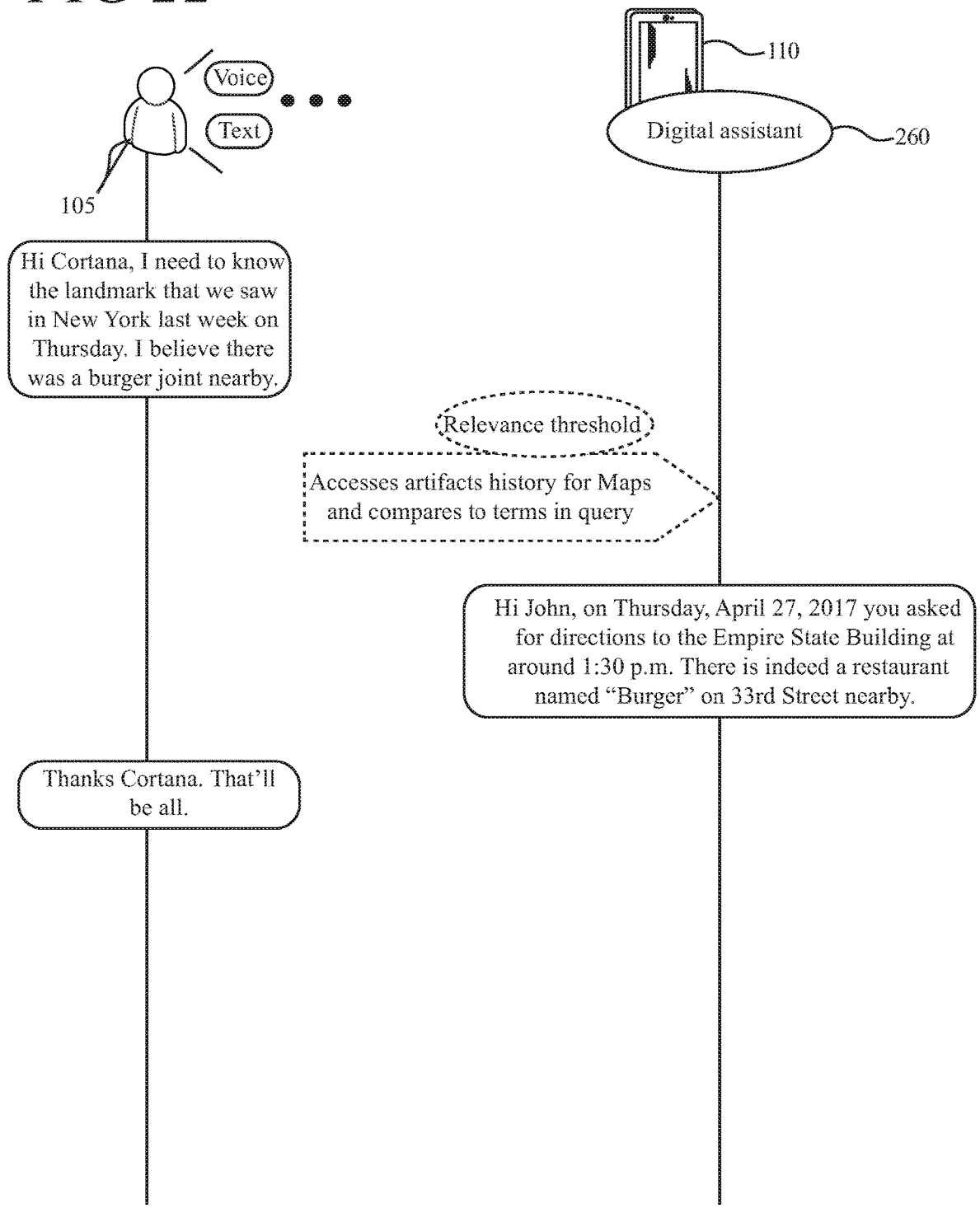
FIG. 22 shows an illustrative user interaction with the digital assistant based on the identified artifacts of FIG. 18.

FIG. 22 shows an illustrative scenario in which the user asks the digital assistant for information about places the user has previously encountered (FIGS. 10 and 18). Specifically, the user queries the digital assistant for the landmark that he saw in New York last Thursday, and also offers that there was a burger restaurant nearby. The digital assistant accesses the stored artifacts related to the map application, verifies a relevance threshold of like terms is satisfied and identifies that on Thursday, Apr. 27, 2017 the user asked for directions to the Empire State Building®. The digital assistant further identified that there was a restaurant named "Burger" nearby on 33$^{rd}$ Street.

In some of the examples provided above with respect to FIGS. 19-22, additional information or keywords provided from the user to the digital assistant may provide the user with better results. For example, in FIG. 22 the user informed the digital assistant that there was a burger restaurant nearby. This allows the digital assistant to narrow down the plethora of artifacts to landmarks that are within a distance threshold to a burger restaurant. Similarly, the keywords for FIG. 21 include "Jaime," "Nick," "April," and "Memo," all of which provides the digital assistant with great opportunity and key terms to identify the most relevant artifacts to present to the user. As further shown in FIG. 21, the digital assistant can present to the user multiple identified artifacts that are responsive to the user's query, and thereby allow the user to select the desired artifact.

In an illustrative embodiment, the digital assistant may ask the user for additional information (e.g., key terms) that may help the digital assistant to locate relevant artifacts. For example, the digital assistant may ask the user for a specific day, date, names of people, names of places, etc. in order to locate the relevant artifact.

Figure 23:
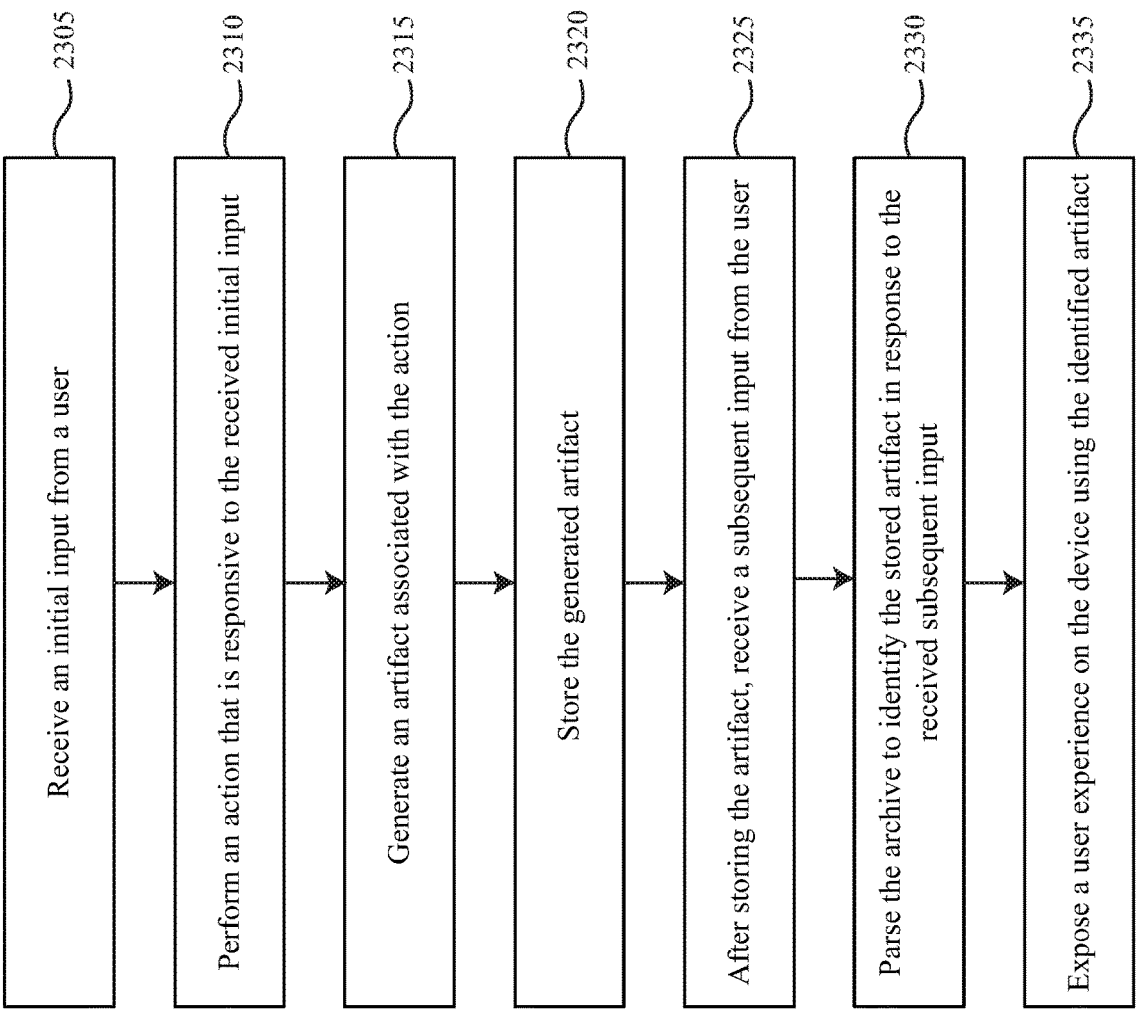
FIGS. 23-25 show illustrative processes performed by the device or digital assistant.
Figure 24:
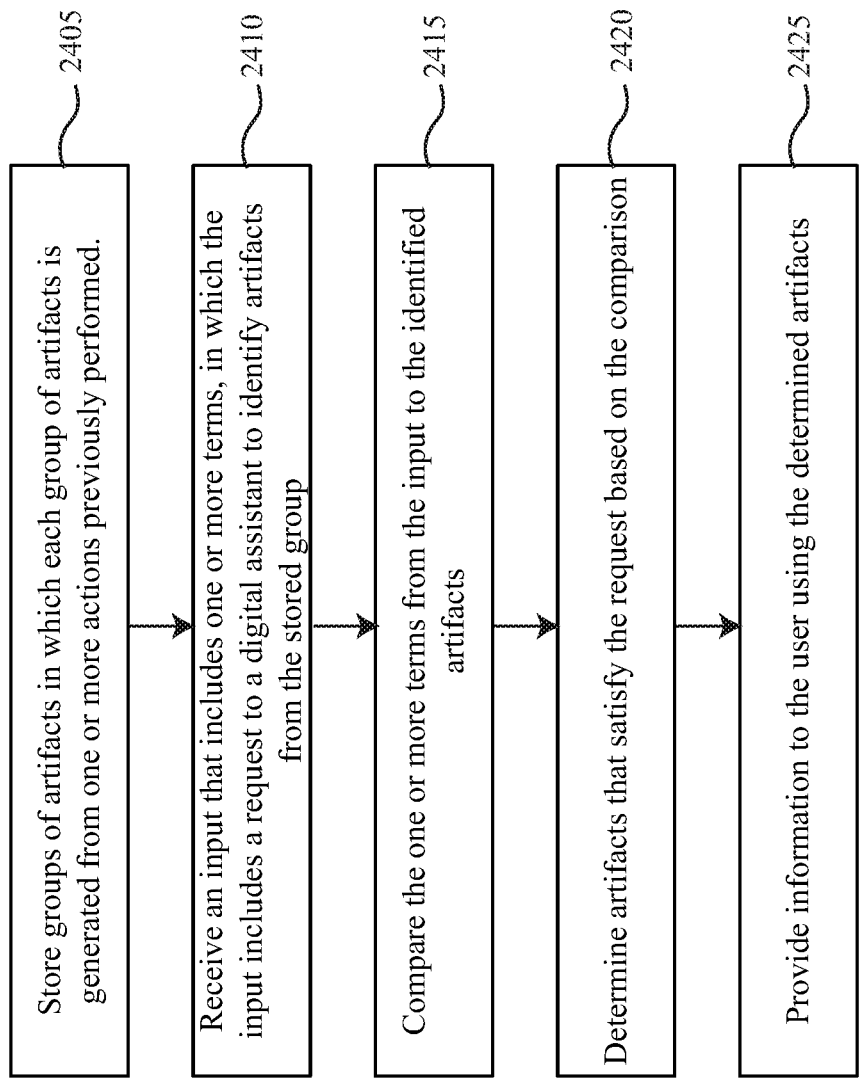
Figure 25:
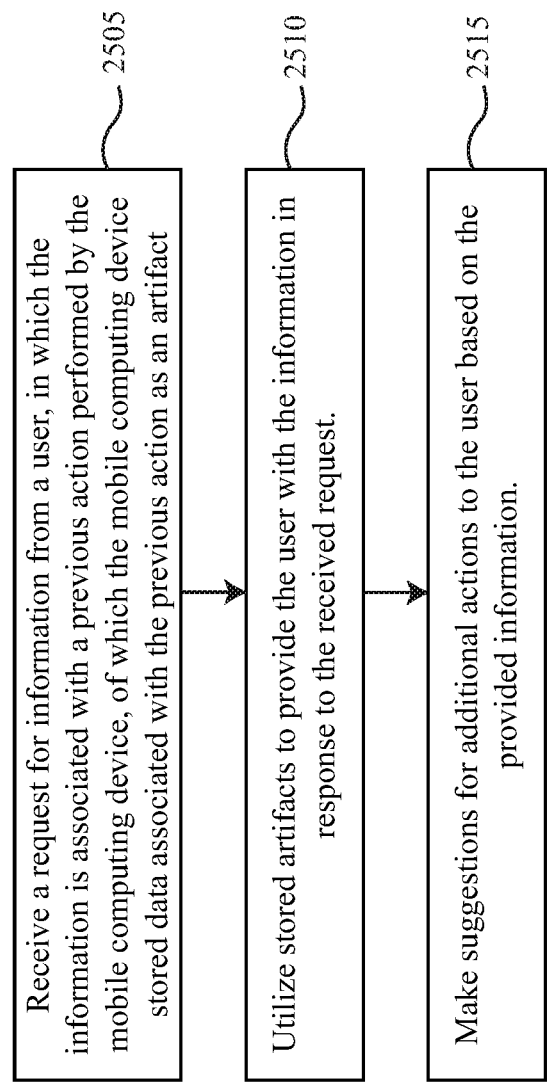

FIG. 23-25 show flowcharts of illustrative methods performed by a computing device that interoperates with a digital assistant. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Turning now to method 2300 shown in FIG. 23, in step 2305 a computing device receives an initial input from a user. At step 2310, an action is performed that is responsive to the received initial input. At step 2315, an artifact associated with the action is generated. At step 2320, the generated artifact is stored. At step 2325, a subsequent input from the user is received after the artifact is stored. At step 2330, the archive is parsed to identify the stored artifact in response to the received subsequent input. At step 2335, a user experience on the device using the identified artifact is exposed.

Method 2400 shown in FIG. 24 is another method that may be implemented on a device that interoperates with a digital assistant. At step 2405, groups of artifacts are stored in which each group of artifacts is generated from one or more actions that were previously performed. At step 2410, an input is received that includes one or more terms, in which the input includes a request to a digital assistant to identify artifacts from the stored group. At step 2415, the one or more terms from the input are compared to the identified artifacts. At step 2420, artifacts are determined that satisfy the request based on the comparison. At step 2425, information is provided to the user using the determined artifacts.

Method 2500 shown in FIG. 25 is another method that may be implemented by a computing device. At step 2505, a request for information is received from a user. The information is associated with a previous action performed by the mobile computing device, of which the mobile computing device stored data associated with the previous action that was performed. At step 2510, the stored artifacts are utilized to provide the user with the information in response to the received request. At step 2515, suggestions for additional actions are made to the user based on the provided information.

Figure 26:
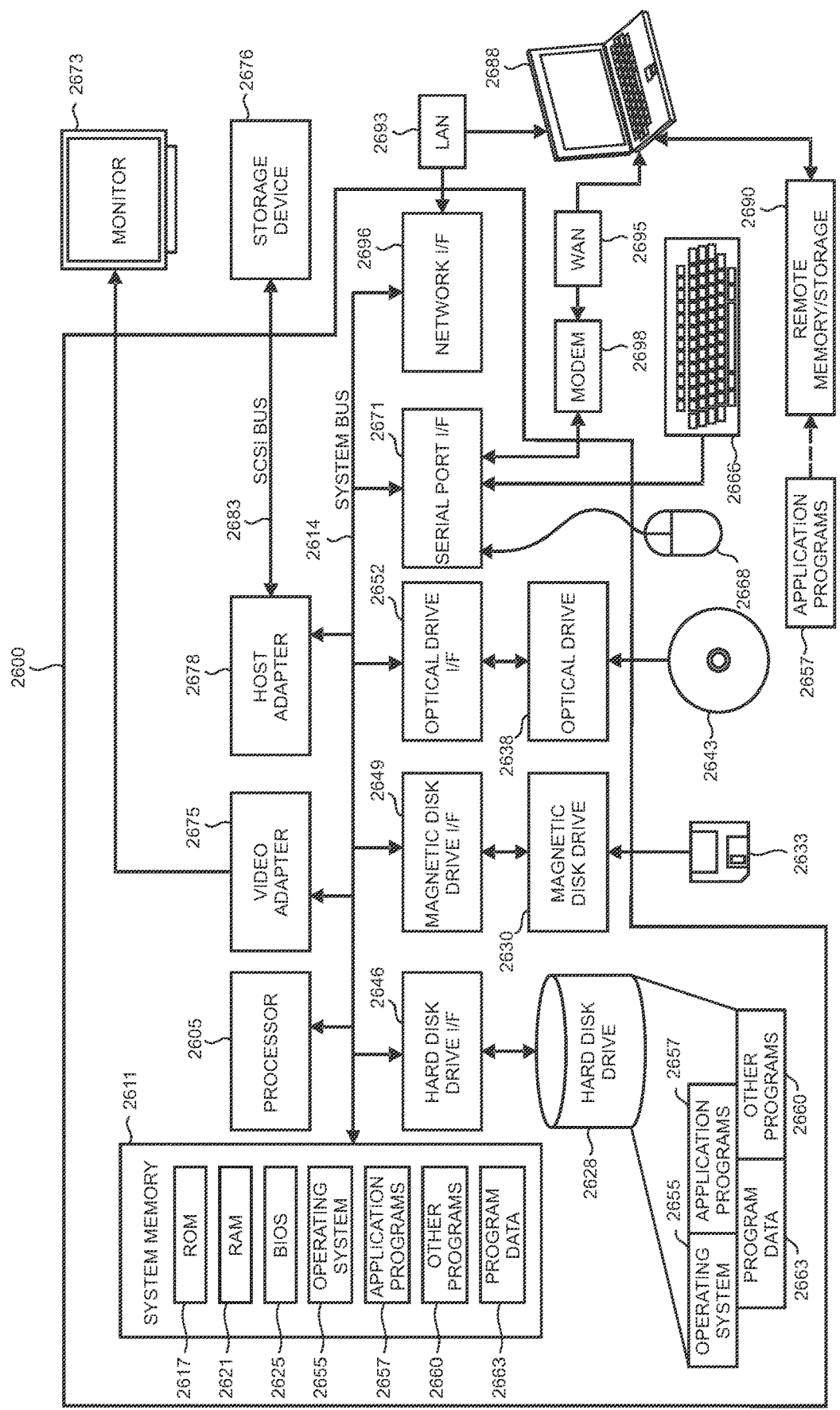
FIG. 26 is a simplified block diagram of an illustrative computer system such as a mobile device that may be used in part to implement the present task creation and completion with bi-directional user interactions.

FIG. 26 is a simplified block diagram of an illustrative computer system 2600 such as a PC, client machine, or server with which the present task creation and completion with bi-directional user interactions is utilized. Computer system 2600 includes a processor 2605, a system memory 2611, and a system bus 2614 that couples various system components including the system memory 2611 to the processor 2605. The system bus 2614 may be any of several types of bus structures including a memory bus or memory controller, a peripheral bus, or a local bus using any of a variety of bus architectures. The system memory 2611 includes read only memory (ROM) 2617 and random access memory (RAM) 2621. A basic input/output system (BIOS) 2625, containing the basic routines that help to transfer information between elements within the computer system 2600, such as during startup, is stored in ROM 2617. The computer system 2600 may further include a hard disk drive 2628 for reading from and writing to an internally disposed hard disk (not shown), a magnetic disk drive 2630 for reading from or writing to a removable magnetic disk 2633 (e.g., a floppy disk), and an optical disk drive 2638 for reading from or writing to a removable optical disk 2643 such as a CD (compact disc), DVD (digital versatile disc), or other optical media. The hard disk drive 2628, magnetic disk drive 2630, and optical disk drive 2638 are connected to the system bus 2614 by a hard disk drive interface 2646, a magnetic disk drive interface 2649, and an optical drive interface 2652, respectively. The drives and their associated computer-readable storage media provide non-volatile storage of computer-readable instructions, data structures, program modules, and other data for the computer system 2600. Although this illustrative example includes a hard disk, a removable magnetic disk 2633, and a removable optical disk 2643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present task creation and completion with bi-directional user interactions. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk 2628, magnetic disk 2630, optical disk 2630, ROM 2617, or RAM 2621, including an operating system 2655, one or more application programs 2657, other program modules 2660, and program data 2663. A user may enter commands and information into the computer system 2600 through input devices such as a keyboard 2666 and pointing device 2668 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2605 through a serial port interface 2671 that is coupled to the system bus 2614, but may be connected by other interfaces, such as a parallel port, game port, or universal serial bus (USB). A monitor 2673 or other type of display device is also connected to the system bus 2614 via an interface, such as a video adapter 2675. In addition to the monitor 2673, personal computers typically include other peripheral output devices (not shown), such as speakers and printers. The illustrative example shown in FIG. 26 also includes a host adapter 2678, a Small Computer System Interface (SCSI) bus 2683, and an external storage device 2676 connected to the SCSI bus 2683.

The computer system 2600 is operable in a networked environment using logical connections to one or more remote computers, such as a remote computer 2688. The remote computer 2688 may be selected as another personal computer, a server, a router, a network PC, a peer device, or other common network node, and typically includes many or all of the elements described above relative to the computer system 2600, although only a single representative remote memory/storage device 2690 is shown in FIG. 26. The logical connections depicted in FIG. 26 include a local area network (LAN) 2693 and a wide area network (WAN) 2695. Such networking environments are often deployed, for example, in offices, enterprise-wide computer networks, intranets, and the Internet.

When used in a LAN networking environment, the computer system 2600 is connected to the local area network 2693 through a network interface or adapter 2696. When used in a WAN networking environment, the computer system 2600 typically includes a broadband modem 2698, network gateway, or other means for establishing communications over the wide area network 2695, such as the Internet. The broadband modem 2698, which may be internal or external, is connected to the system bus 2614 via a serial port interface 2671. In a networked environment, program modules related to the computer system 2600, or portions thereof, may be stored in the remote memory storage device 2690. It is noted that the network connections shown in FIG. 26 are illustrative and other methods of establishing a communications link between the computers may be used depending on the specific requirements of an application of the present task creation and completion with bi-directional user interactions.

Figure 27:
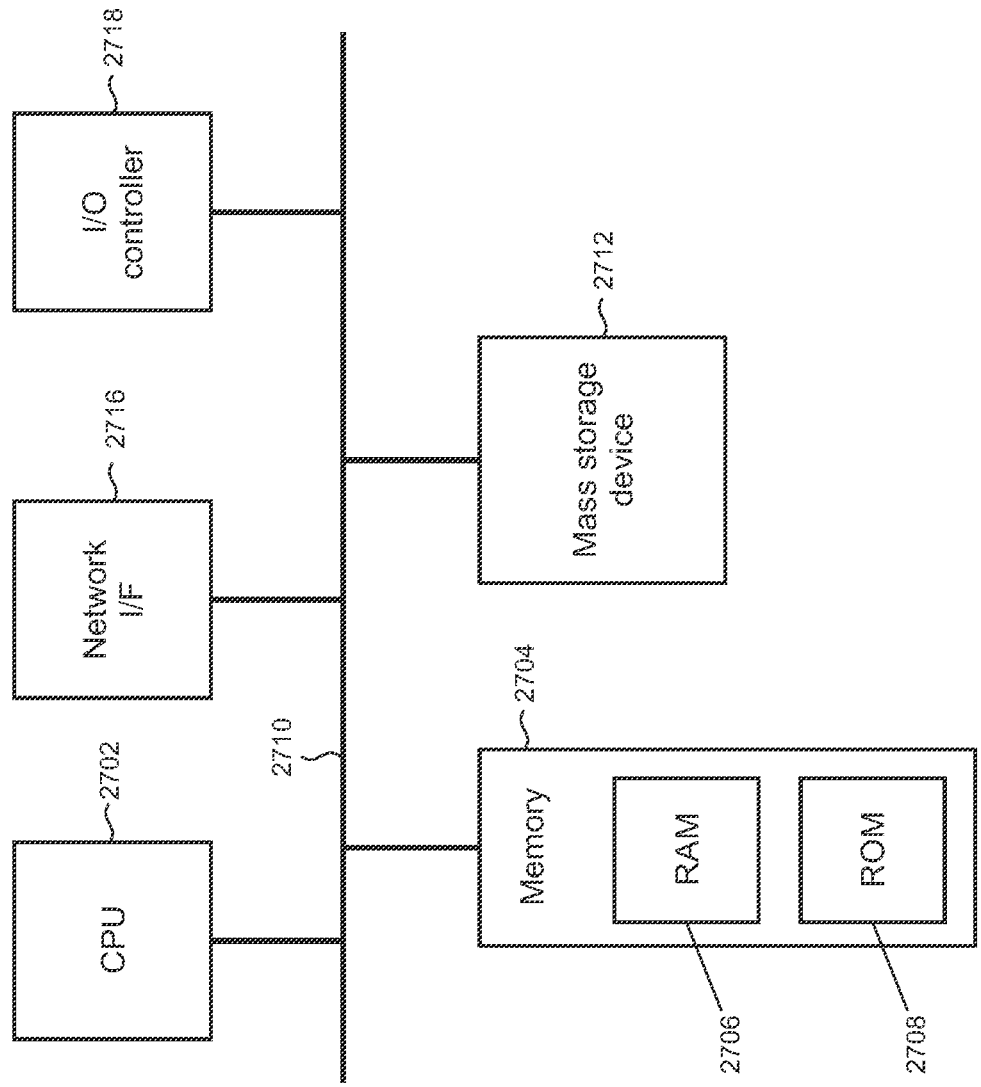
FIG. 27 shows a block diagram of an illustrative device that may be used in part to implement the present task creation and completion with bi-directional user interactions.

FIG. 27 shows an illustrative architecture 2700 for a device capable of executing the various components described herein for providing a task creation and completion with bi-directional user interactions. Thus, the architecture 2700 illustrated in FIG. 27 shows an architecture that may be adapted for a server computer, mobile phone, a PDA, a smartphone, a desktop computer, a netbook computer, a tablet computer, GPS device, gaming console, and/or a laptop computer. The architecture 2700 may be utilized to execute any aspect of the components presented herein.

The architecture 2700 illustrated in FIG. 27 includes a CPU (Central Processing Unit) 2702, a system memory 2704, including a RAM 2706 and a ROM 2708, and a system bus 2710 that couples the memory 2704 to the CPU 2702. A basic input/output system containing the basic routines that help to transfer information between elements within the architecture 2700, such as during startup, is stored in the ROM 2708. The architecture 2700 further includes a mass storage device 2712 for storing software code or other computer-executed code that is utilized to implement applications, the file system, and the operating system.

The mass storage device 2712 is connected to the CPU 2702 through a mass storage controller (not shown) connected to the bus 2710. The mass storage device 2712 and its associated computer-readable storage media provide non-volatile storage for the architecture 2700.

Although the description of computer-readable storage media contained herein refers to a mass storage device, such as a hard disk or CD-ROM drive, it may be appreciated by those skilled in the art that computer-readable storage media can be any available storage media that can be accessed by the architecture 2700.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2700.

According to various embodiments, the architecture 2700 may operate in a networked environment using logical connections to remote computers through a network. The architecture 2700 may connect to the network through a network interface unit 2716 connected to the bus 2710. It may be appreciated that the network interface unit 2716 also may be utilized to connect to other types of networks and remote computer systems. The architecture 2700 also may include an input/output controller 2718 for receiving and processing input from a number of other devices, including a keyboard, mouse, or electronic stylus (not shown in FIG. 27). Similarly, the input/output controller 2718 may provide output to a display screen, a printer, or other type of output device (also not shown in FIG. 27).

It may be appreciated that the software components described herein may, when loaded into the CPU 2702 and executed, transform the CPU 2702 and the overall architecture 2700 from a general-purpose computing system into a special-purpose computing system customized to facilitate the functionality presented herein. The CPU 2702 may be constructed from any number of transistors or other discrete circuit elements, which may individually or collectively assume any number of states. More specifically, the CPU 2702 may operate as a finite-state machine, in response to executable instructions contained within the software modules disclosed herein. These computer-executable instructions may transform the CPU 2702 by specifying how the CPU 2702 transitions between states, thereby transforming the transistors or other discrete hardware elements constituting the CPU 2702.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2700 in order to store and execute the software components presented herein. It also may be appreciated that the architecture 2700 may include other types of computing devices, including handheld computers, embedded computer systems, smartphones, PDAs, and other types of computing devices known to those skilled in the art. It is also contemplated that the architecture 2700 may not include all of the components shown in FIG. 27, may include other components that are not explicitly shown in FIG. 27, or may utilize an architecture completely different from that shown in FIG. 27.

Various exemplary embodiments of the present task creation and completion with bi-directional user interactions are now presented by way of illustration and not as an exhaustive list of all embodiments. An example includes a method performed on a computing device, comprising: receiving an initial input from a user of the computing device; performing an action that is responsive to the received initial input; generating an artifact associated with the action; storing the artifact in an archive; after storing the artifact, receiving a subsequent input from the user; parsing the archive to identify the stored artifact in response to the received subsequent input; and exposing a user experience on the device using the identified artifact.

In another example, the performed action based on the received initial input is associated with one or more of searching a network, searching the Internet, capturing an image, capturing video, communicating with other users or devices, setting calendar appointments, setting reservations, or interacting with a map application. In another example, when the performed action is the Internet search, the generated artifact includes one or more of a portion of text from a search query, search results, URL (Uniform Resource Locator) for websites selected by a user, content associated with the selected URL, or the user's actions with the search results. In another example, when the performed action is capturing an image or capturing video, the generated artifact includes at least one of landmarks, people, public establishments, private establishments, user emotions, identifiable objects, date of image or video capture, or time of image or video capture. In another example, the communicating with other users includes one or more of a video call, audio call, text message, or e-mail, and when the performed action is communicating with other users, the generated artifact includes one or more of meeting participants, duration of meeting, date of meeting, time of meeting, topics discussed, or objects or data transferred or referenced during the communicating. In another example, when the performed action is interacting with the map application, the generated artifact includes one or more of location of the computing device, directions history, search history, nearby public establishments, nearby private establishments, nearby contacts, date associated with map application actions, or time associated with map application actions. In another example, the identification of the stored artifact comprises analysis that is performed in real time or using one or more offline processes. In another example, the computing device includes a digital assistant that interoperates with multiple applications exposed on the computing device, wherein the digital assistant identifies and generates an artifact while the user uses an application, and wherein the subsequent inputs are directed to the digital assistant. In another example, the computing device indexes multiple artifacts associated with respective multiple device actions or functions, and the indexed multiple artifacts are stored for a predetermined time period. In another example, the method further comprises: identifying more than one artifact that is responsive to the subsequent input; providing each of the more than one artifact to a user for selection; receiving a selection from the user for one artifact of the more than one artifact; and providing the user with the selected one artifact. In another example, the first input is from the computing device and the subsequent input is from a second computing device, and the provided artifact is provided on the second computing device, wherein both computing devices are associated with a single user.

A further examples includes one or more hardware-based computer-readable memory devices storing instructions which, when executed by one or more processors disposed in a computing device, cause the computing device to: store groups of artifacts, each group of artifacts being generated from one or more actions previously performed by the computing device; receive an input from a device user that includes one or more terms, wherein the input comprises a request to a digital assistant executing on the computing device to identify artifacts from the stored group; compare the one or more terms from the input to the identified artifacts; determine artifacts that satisfy the request based on the comparison; and provide information to the user using the determined artifacts.

In another example, the action includes capturing an image; communicating with other users or other devices using one of voice, text, or video; performing a web search; or using a map application. In another example, the digital assistant provides the user with a suggestion to launch an application based on the determined artifacts. In another example, the user is provided with multiple artifacts that are determined to satisfy the input, and the computing device arranges a prompt for the user to select one of the multiple artifacts provided. In another example, the determination of artifacts satisfying the input is based on the comparison meeting a relevance threshold.

A further example includes a mobile computing device, comprising: one or more processors; a display device supporting a graphical user interface (GUI) configured to support interactions with a mobile computing device user; and one or more hardware-based memory devices storing a plurality of applications and further storing computer-readable instructions which, when executed by the one or more processors cause the mobile computing device to: receive a request for information from a user, wherein the information is associated with a previous action performed by the mobile computing device, and in which the mobile computing device stores data associated with the previous action as an artifact, the artifact including one or more of data, metadata, or objects and being stored in an archive; utilize stored artifacts to provide the user with the information in response to the received request; and make suggestions for additional actions to the user based on the provided information.

In another example, the archive is configured as an indexed archive. In another example, the actions include one or more of posting the information or an object associated with the information on social media, attaching and messaging the object associated with the information to another user, opening the information or the object associated with the information in an application, or opening a web browser to a particular website. In another example, the object associated with the information includes a document, image, video file, or audio file.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed on a computing device having an operating system and hardware components, comprising:
    receiving an initial input from a user of the computing device among a plurality of other computing devices that are each associated with the user, the initial input pertaining to content or events and implemented using one or more applications that execute on the computing device;
    performing an action for the content or the events using the computing device that is responsive to the received initial input;
    analyzing context for the performed action, the context including configuration and operational state of each of the applications, operating system, and hardware components;
    generating one or more artifacts for the performed action using the analyzed context, wherein the one or more artifacts comprise information or data that describe the performed action;
    storing the one or more artifacts in a remote archive, in which the remote archive stores multiple artifacts that describe a respective plurality of different actions performed by one or more of the plurality of other computing devices;
    after storing the one or more artifacts, receiving a subsequent input from the user about the content or the events;
    parsing the remote archive to identify artifacts for the content or the events that are responsive to the received subsequent input;
    retrieving the identified artifacts from the remote archive in response to the parsing;
    providing the retrieved artifacts to the user for selection;
    receiving a user selection of an artifact from the retrieved artifacts; and
    exposing a user experience on the computing device using at least the selected artifact,
    wherein the initial input, the received subsequent input and the user selection are receivable at each of the plurality of other computing devices so that artifacts in the remote archive are retrievable at each of the plurality of other computing devices.

2. The method of claim 1, wherein the performed action based on the received initial input is associated with one or more of searching a network, searching the World Wide Web, capturing an image, capturing video, communicating with other users or devices, setting calendar appointments, setting reservations, or interacting with a map application.

3. The method of claim 2, wherein, when the performed action is the Internet search, the generated one or more artifacts include one or more of a portion of text from a search query, search results, URL (Uniform Resource Locator) for websites selected by a user, content associated with the selected URL, or the user's actions with the search results.

4. The method of claim 2, wherein, when the performed action is capturing an image or capturing video, the generated one or more artifacts include at least one of landmarks, people, public establishments, private establishments, user emotions, identifiable objects, date of image or video capture, or time of image or video capture.

5. The method of claim 2, wherein the communicating with other users includes one or more of a video call, audio call, text message, or e-mail, and when the performed action is communicating with other users, the generated one or more artifacts include one or more of meeting participants, duration of meeting, date of meeting, time of meeting, topics discussed, or objects or data transferred or referenced during the communicating.

6. The method of claim 2, wherein, when the performed action is interacting with the map application, the generated one or more artifacts include one or more of location of the computing device, directions history, search history, nearby public establishments, nearby private establishments, nearby contacts, date associated with map application actions, or time associated with map application actions.

7. The method of claim 1, wherein the analysis is performed in real time or using one or more offline processes.

8. The method of claim 1, wherein the computing device includes a digital assistant that interoperates with multiple applications exposed on the computing device,
  wherein the one or more artifacts are generated while the user uses an application, and
  wherein the subsequent inputs are directed to the digital assistant.

9. The method of claim 1, wherein the computing device indexes artifacts associated with actions or functions performed on multiple devices associated with the user, and the indexed artifacts are stored for a predetermined time period.

* * * * *